(12) United States Patent
Liu et al.

(10) Patent No.: US 10,856,267 B2
(45) Date of Patent: Dec. 1, 2020

(54) INFORMATION INDICATION METHOD AND RELATED DEVICE

(71) Applicant: HUAWEI TECHNOLOGIES CO., LTD., Shenzhen (CN)

(72) Inventors: Jianqin Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/134,390

(22) Filed: Sep. 18, 2018

(65) Prior Publication Data

US 2019/0053212 A1  Feb. 14, 2019

Related U.S. Application Data

(63) Continuation of application No. PCT/CN2018/091693, filed on Jun. 15, 2018.

(30) Foreign Application Priority Data

Aug. 10, 2017  (CN) .......................... 2017 1 0682009

(51) Int. Cl.
*H04W 72/04* (2009.01)
*H04L 5/00* (2006.01)
(Continued)

(52) U.S. Cl.
CPC ...... *H04W 72/0406* (2013.01); *H04B 7/0617* (2013.01); *H04B 7/0628* (2013.01);
(Continued)

(58) Field of Classification Search
CPC ... H04B 7/0617; H04B 7/0628; H04L 5/0007; H04L 5/0023; H04L 5/0048;
(Continued)

(56) References Cited

U.S. PATENT DOCUMENTS 10,405,332 B2 * 9/2019 Papasakellariou ........................... H04W 72/1215
10,524,244 B2 * 12/2019 Tsai ..................... H04B 7/0617
(Continued)

FOREIGN PATENT DOCUMENTS

CN  105144621 A  12/2015
CN  106937394 A   7/2017
(Continued)

OTHER PUBLICATIONS

Vivo, Discussion on numerology multiplexing, Jan. 20, 2017, 3GPP, 3GPP TSG RAN WG1 AH_NR Meeting, Tdoc: R1-1700284 (Year: 2017).*

(Continued)

*Primary Examiner* — Eric Nowlin
(74) *Attorney, Agent, or Firm* — Fish & Richardson P.C.

(57) ABSTRACT

This application discloses example information indication methods and related devices. In one example method, a terminal device receives first information used to instruct the terminal device to receive a first channel in a first time unit, and second information used to instruct the terminal device to receive a second channel in a second time unit. The terminal device receives the first channel based on the first information. When the first time unit is equal to the second time unit, the terminal device receives the second channel based on the first information, where the second information is a first indicator value. When the first time unit is not equal to the second time unit, the terminal device receives the second channel based on the second information where the second information is a second indicator value.

24 Claims, 7 Drawing Sheets

(51) Int. Cl.
  *H04B 7/06* (2006.01)
  *H04W 88/02* (2009.01)
(52) U.S. Cl.
  CPC .......... *H04L 5/0007* (2013.01); *H04L 5/0048* (2013.01); *H04L 5/0082* (2013.01); *H04L 5/0091* (2013.01); *H04L 5/0023* (2013.01); *H04W 72/044* (2013.01); *H04W 88/02* (2013.01)
(58) Field of Classification Search
  CPC ... H04L 5/0053; H04L 5/0082; H04L 5/0091; H04L 5/0094; H04W 28/06; H04W 48/12; H04W 72/04; H04W 72/0406; H04W 72/042; H04W 72/0446; H04W 88/02
  See application file for complete search history.

(56) References Cited

U.S. PATENT DOCUMENTS

| | | | |
|---|---|---|---|
| 10,568,041 B2* | 2/2020 | MolavianJazi | H04W 52/08 |
| 10,660,044 B2* | 5/2020 | MolavianJazi | H04W 52/08 |
| 2014/0314007 A1 | 10/2014 | Chen et al. | |
| 2017/0332359 A1* | 11/2017 | Tsai | H04B 7/0617 |
| 2018/0070369 A1* | 3/2018 | Papasakellariou | H04L 5/0094 |
| 2018/0227031 A1* | 8/2018 | Guo | H04B 7/0626 |
| 2019/0074880 A1* | 3/2019 | Frenne | H04B 7/0634 |
| 2019/0081740 A1* | 3/2019 | Kaikkonen | H04L 1/1812 |
| 2019/0140808 A1* | 5/2019 | Matsuda | H04L 1/0026 |
| 2019/0158205 A1* | 5/2019 | Sheng | H04J 11/0073 |
| 2019/0159135 A1* | 5/2019 | MolavianJazi | H04L 5/001 |
| 2019/0159136 A1* | 5/2019 | MolavianJazi | H04W 52/365 |
| 2019/0239093 A1* | 8/2019 | Zhang | H04W 72/046 |
| 2019/0253904 A1* | 8/2019 | Tsai | H04L 5/0094 |
| 2019/0280757 A1* | 9/2019 | Yang | H04L 5/0048 |
| 2019/0289622 A1* | 9/2019 | Chatterjee | H04W 72/1278 |
| 2019/0297637 A1* | 9/2019 | Liou | H04W 72/1289 |
| 2019/0297640 A1* | 9/2019 | Liou | H04L 5/001 |
| 2019/0306852 A1* | 10/2019 | Nayeb Nazar | H04L 5/0055 |
| 2019/0306856 A1* | 10/2019 | Ji | H04W 76/10 |
| 2019/0313440 A1* | 10/2019 | John Wilson | H04L 27/2666 |
| 2019/0334599 A1* | 10/2019 | Davydov | H04L 5/0051 |
| 2019/0334691 A1* | 10/2019 | Bendlin | H04L 5/0053 |
| 2019/0349915 A1* | 11/2019 | Ahn | H04W 16/28 |
| 2019/0357198 A1* | 11/2019 | Xiong | H04L 5/14 |
| 2019/0380140 A1* | 12/2019 | Wong | H04W 88/06 |
| 2019/0387533 A1* | 12/2019 | Papasakellariou | H04W 72/1215 |
| 2020/0008233 A1* | 1/2020 | Xiong | H04W 72/1289 |
| 2020/0052844 A1* | 2/2020 | Yu | H04B 7/00 |
| 2020/0059951 A1* | 2/2020 | Frenne | H04L 5/0057 |
| 2020/0145982 A1* | 5/2020 | Cheng | H04W 72/048 |

FOREIGN PATENT DOCUMENTS

| | | | | |
|---|---|---|---|---|
| CN | 110366250 A | * | 10/2019 | ........ H04W 72/1289 |
| CN | 110366865 A | * | 10/2019 | .......... H04W 72/046 |
| EP | 1598970 A1 | | 11/2005 | |
| EP | 3379882 A1 | | 9/2018 | |
| EP | 3547781 A1 | * | 10/2019 | ........ H04W 72/1273 |
| KR | 20190112662 A | * | 10/2019 | ........ H04W 72/1273 |
| WO | 2017023231 A1 | | 2/2017 | |
| WO | WO-2018144877 A1 | * | 8/2018 | ........ H04W 72/0453 |
| WO | WO-2019029730 A1 | * | 2/2019 | ............... H04L 5/00 |
| WO | WO-2019099659 A1 | * | 5/2019 | ........... H04L 5/0094 |
| WO | WO-2019154344 A1 | * | 8/2019 | ........ H04W 72/0446 |

OTHER PUBLICATIONS

Zte et al., DL Common Control for NR, Feb. 17, 2017, 3GPP, 3GPP TSG RAN WG1 Meeting #88, Tdoc: R1-1701584 (Year: 2017).*
Intel Corporation, On beam indication on control and data channel, Feb. 17, 2017, 3GPP, 3GPP TSG RAN WG1 #88, Tdoc: R1-1702200 (Year: 2017).*
Intel Corporation, Cross-carrier QCL for NR, Feb. 13, 2017, 3GPP, 3GPP TSG RAN WG1 Meeting #88, Tdoc: R1-1702215 (Year: 2017).*
Qualcomm Incorporated, Discussion on QCL, Feb. 13, 2017, 3GPP, 3GPP TSG RAN WG1 Meeting #88, Tdoc: R1-1702619 (Year: 2017).*
Ericsson, On QCL for DL RS and on spatial QCL definition, Feb. 13, 2017, 3GPP, 3GPP TSG RAN WG1 Meeting #88, Tdoc: R1-1702692 (Year: 2017).*
Ericsson, On QCL for UL RS, Feb. 13, 2017, 3GPP, 3GPP TSG RAN WG1 Meeting #88, Tdoc: R1-1702693 (Year: 2017).*
Samsung, On DL QCL for NR, Feb. 13, 2017, 3GPP, 3GPP TSG RAN WG1#88, Tdoc: R1-1702961 (Year: 2017).*
Samsung, On UL QCL for NR, Feb. 13, 2017, 3GPP, 3GPP TSG RAN WG1#88, Tdoc: R1-1702962 (Year: 2017).*
Nokia et al., Beam management—QCL association between DL RS and DMRS for NR-PDCCH, Feb. 13, 2017, 3GPP, 3GPP TSG RAN WG1#88, Tdoc: R1-1703166 (Year: 2017).*
Intel Corporation, QCL assumption for DM-RS antenna ports, Apr. 3, 2017, 3GPP, 3GPP TSG RAN WG1 Meeting #88bis, Tdoc: R1-1704690 (Year: 2017).*
Intel Corporation, Cross-carrier QCL for NR, Apr. 3, 2017, 3GPP, 3GPP TSG RAN WG1 Meeting #88bis, Tdoc: R1-1704738 (Year: 2017).*
Qualcomm Incorporated, Discussion on QCL, Apr. 3, 2017, 3GPP, 3GPP TSG RAN WG1 Meeting #88bis, Tdoc: R1-1705596 (Year: 2017).*
Ericsson, On the definition of spatial QCL, Apr. 3, 2017, 3GPP, 3GPP TSG RAN WG1 Meeting #88bis, Tdoc: R1-1705913 (Year: 2017).*
Nokia et al., On QCL Framework and Configurations in NR, Apr. 3, 2017, 3GPP, 3GPP TSG RAN WG1 Meeting #88bis, Tdoc: R1-1705975 (Year: 2017).*
Nokia et al., Beam management—QCL association between DL RS and DMRS for NR-PDCCH, Apr. 3, 2017, 3GPP, 3GPP TSG RAN WG1#88 bis, Tdoc: R1-1705987 (Year: 2017).*
Qualcomm Incorporated, Discussion on QCL, May 15, 2017, 3GPP, 3GPP TSG RAN WG1 #89, Tdoc: R1-1708601 (Year: 2017).*
Nokia et al., BPL definition and Spatial QCL time indication, May 15, 2017, 3GPP, 3GPP TSG RAN WG1 #89, Tdoc: R1-1708906 (Year: 2017).*
Huawei et al., Details of QCL assumptions and related RS design considerations, Jun. 27, 2017, 3GPP, 3GPP TSG RAN WG1 NR Ad-Hoc #2, Tdoc: R1-1709935 (Year: 2017).*
Intel Corporation, On QCL for different BW parts and other QCL details, Jun. 27, 2017, 3GPP TSG RAN WG1 NR Ad-Hoc #2, Tdoc: R1-1710539 (Year: 2017).*
Samsung, QCL associations for beam management RS, Jun. 27, 2017, 3GPP, 3GPP TSG RAN WG1 NR Ad-Hoc#2, Tdoc: R1-1710664 (Year: 2017).*
Ericsson, The QCL framework in NR, Jun. 27, 2017, 3GPP, 3GPP TSG RAN WG1 NR Ad-Hoc#2, Tdoc: R1-1711051 (Year: 2017).*
Qualcomm Incorporated, Discussion on QCL, Jun. 27, 2017, 3GPP, 3GPP TSG RAN WG1 NR Ad-Hoc#2, Tdoc: R1-1711176 (Year: 2017).*
Nokia et al., BPL definition and Spatial QCL time indication, Jun. 27, 2017, 3GPP, 3GPP TSG RAN WG1 NR Ad-Hoc#2, Tdoc: R1-1711292 (Year: 2017).*
Nokia et al., Summary of QCL, Jun. 27, 2017, 3GPP, 3GPP TSG RAN WG1 NR Ad-Hoc#2, Tdoc: R1-1711672 (Year: 2017).*
Extended European Search Report issued in European Application No. 18758795.1 dated Jun. 19, 2019, 11 pages.
R1-1710281 LG Electronics,"Discussion on DL beam management",3GPP TSG RAN WG1 NR Ad-Hoc#2,Qingdao, P.R. China Jun. 27-30, 2017,total 5 pages.
R1-1702324 InterDigital Communications,"On Beam Management for Control and Data Channels",3GPP TSG-RAN WG1 #88,Athens, Greece, Feb. 13-17, 2017,total 4 pages.
Sumsung,"R1#88 agreemen▼-beam switch offset",3GPP TSG RAN WG1 Meeting #88,Feb. 13-17, 2017, total 1 pages.
3GPP TS 38.213 V0.0.1 (Jul. 2017),3rd Generation Partnership Project;Technical Specification Group Radio Access Network;NR;Physical layer procedures for control(Release 15),total 13 pages.

(56) References Cited

OTHER PUBLICATIONS

3GPP TS 38.211 V0.0.0 (May 2017),3rd Generation Partnership Project;Technical Specification Group Radio Access Network;NR;Physical channels and modulation(Release 15),total 10 pages.
3GPP TS 38.214 V0.0.1 (Jul. 2017),3rd Generation Partnership Project;Technical Specification Group Radio Access Network;NR;Physical layer procedures for data(Release 15),total 30 pages.
International Search Report issued in International Application No. PCT/CN2018/091693 dated Sep. 7, 2018, 10 pages.

\* cited by examiner

INFORMATION INDICATION METHOD AND RELATED DEVICE

CROSS-REFERENCE TO RELATED APPLICATIONS

This application is a continuation of International Application No. PCT/CN2018/091693, filed on Jun. 15, 2018, and claims priority to Chinese Patent Application No. 201710682009.9, filed on Aug. 10, 2017. The disclosures of the aforementioned applications are hereby incorporated by reference in their entireties.

TECHNICAL FIELD

This application relates to the field of communications technologies, and in particular, to an information indication method and a related device.

BACKGROUND

To reduce a relatively large propagation loss caused by a high frequency band, a communications system may use a transmission mechanism that is based on a beamforming technology, and the transmission mechanism compensates for a loss in a signal propagation process by using a relatively large antenna gain. In a beam management mechanism, a receive beam used by user equipment may be indicated by a base station side by using beam indication information. In other words, the beam indication information is used to indicate information related to the receive beam of the user equipment, so as to prevent the user equipment from scanning a beam for a long time, thereby saving power.

However, when the base station side simultaneously sends a physical downlink control channel and a physical downlink shared channel, the user equipment can use only one receive beam at a same moment to receive a PDCCH and the PDSCH. Consequently, there is a signaling redundancy problem in beam indication information sent by the base station side for the PDCCH and beam indication information sent by the base station side for the PDSCH.

SUMMARY

This application provides an information indication method and a related device, and a plurality of channels may be received by using same receiving indication information, to avoid signaling redundancy, and indicate other information by using redundant receiving indication information, thereby improving signaling indication efficiency.

According to an aspect, this application provides an information indication method. In the method, a terminal device may receive first information, and may further receive second information, and the first information is information used to instruct the terminal device to receive a first channel in a first time unit, and the second information is information used to instruct the terminal device to receive a second channel in a second time unit. The terminal device receives the first channel based on the first information. The terminal device may receive the second channel based on the first information when the first time unit is equal to the second time unit, and the second information is a first indicator value; or the terminal device receives the second channel based on the second information when the first time unit is not equal to the second time unit, and the second information is a second indicator value. When the first time unit is equal to the second time unit, data is received on the first channel and the second channel at a same receiving moment, in other words, a same time unit is multiplexed on the two channels, so that the terminal device may use a same receive beam when receiving the first channel and the second channel. In other words, the first information may be used for receiving the first channel and the second channel. Correspondingly, the second information for receiving the second channel may be used as the first indicator value. It can be learned that the method helps to use the first information and the second information in signaling to a greatest extent, so as to avoid repeated indication from the first information and the second information, and reuse the second information to indicate more other information, thereby reducing redundant information and improving signaling indication efficiency.

In an implementation, when the first channel is a physical downlink control channel, the second channel is a physical downlink shared channel, in other words, when data is received in a same time unit on the physical downlink control channel and the physical downlink shared channel, the data may be received by using a receive beam indicated by beam indication information of the physical downlink control channel (the first information is information used to instruct the terminal device to receive the first channel in the first time unit, in other words, the first information may be or may include the beam indication information of the physical downlink control channel). Correspondingly, beam indication information of the physical downlink shared channel may be used as the first indicator value (the second information is information used to instruct the terminal device to receive the second channel in the second time unit, in other words, the second information may be or may include the beam indication information of the physical downlink shared channel).

The first indicator value may be indication information of a time domain resource location of the second channel, for example, the first indicator value may be a start symbol indication of the second channel; or the first indicator value may be indication information of a frequency domain resource location of the second channel, for example, the first indicator value may be an indication of a frequency domain resource of the first channel that needs to be removed from a frequency domain resource of the second channel; or the first indicator value may be indication information of a time domain resource location of the second channel and indication information of a frequency domain resource location of the second channel, for example, the first indicator value may be a start symbol indication of the second channel and an indication of a frequency domain resource of the first channel that needs to be removed from a frequency domain resource of the second channel; or the first indicator value may be indication information of a frequency domain resource granularity of the second channel, for example, the first indicator value may be an indication of a resource block group (Resource Block Group, RBG) size; or the first indicator value may be indication information of a time domain resource granularity of the second channel, for example, the first indicator value may be an indication of information about a time domain interval occupied by the second channel; or the first indicator value may be indication information of a time domain resource granularity of the second channel and indication information of a frequency domain resource granularity of the second channel, for example, the first indicator value may be an indication of information about a time domain interval of the second channel and an indication of a resource block group (Resource Block Group, RBG) size.

It can be learned that in this implementation, the second information may be used to indicate the foregoing resource location information of the second channel, the information about the time domain interval or the frequency domain resource granularity of the second channel, or the like, so as to help to receive the second channel. For example, when data is received on the first channel and the second channel in a same time unit, the second information is the first indicator value, and the first indicator value may be the foregoing indication information used to indicate additional information required in a frequency division multiplexing case, for example, a time domain resource location and/or a frequency domain resource location of the second channel, and/or a time-frequency resource scheduling granularity. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine information such as a time domain resource location and/or a frequency domain resource location, or a time domain resource scheduling granularity and/or a frequency domain resource scheduling granularity that are/is used when the second channel is received.

In an implementation, the second information may be the second indicator value, and the second indicator value may be indication information used to instruct the terminal device to receive the second channel. Alternatively, the second indicator value includes quasi-co-location QCL information between a first reference signal and a second reference signal, and the first information also includes quasi-co-location QCL information between the first reference signal and the second reference signal.

In this implementation, the terminal device may receive the second channel based on the second indicator value, and the terminal device receives the first channel based on the first information. The quasi-co-location QCL information may also be referred to as quasi-co-location QCL (Quasi-Co-Location, QCL). The QCL information is used to help to describe receive side beamforming information and a receiving procedure of the terminal device.

To reduce overheads of indicating QCL information of the terminal device side by a network device side, in an optional implementation, the network device side may indicate that a QCL relationship is met between a demodulation reference signal of the first channel or the second channel and one or more of a plurality of reference signal resources previously reported by the terminal device. For example, the reference signal may be a channel state information-reference signal (Channel State Information-Reference Signal, CSI-RS). Herein, each reported index of a CSI-RS resource corresponds to one transmit and receive beam pair previously established when the CSI-RS resource is measured. It should be understood that receive beam information of two reference signals or channels that meet the QCL relationship is the same, so that the terminal device may deduce receive beam information of the first channel or the second channel based on the index of the reference signal resource.

For example, a receive beam used by the terminal device to receive a Demodulation Reference Signal (DMRS) is the same as one receive beam in a plurality of CSI-RS measurement-based transmit and receive beam pairs that are previously reported by the terminal device. In other words, the QCL information may include at least one of a beam group index number of the second reference signal, a resource index number of the second reference signal, a port number of the second reference signal, and a port group number of the second reference signal that are reported by the terminal device. The second reference signal corresponds to one of the plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device. The resource index number that is of the second reference signal and that is reported by the terminal device may be one relative index number in a set including a plurality of resource index numbers reported by the terminal device. For example, if the terminal device reports four absolute resource index numbers {1, 5, 7, 9} of the second reference signal, based on the report result of the terminal device, a relative resource index number of the second reference signal is any one of {0, 1, 2, 3}. The relative resource index number 0 corresponds to the resource index number 1 that is of the second reference signal and that is reported by the terminal device. The relative resource index number 1 corresponds to the resource index number 5 that is of the second reference signal and that is reported by the terminal device. The relative resource index number 2 corresponds to the resource index number 7 that is of the second reference signal and that is reported by the terminal device. The relative resource index number 3 corresponds to the resource index number 9 that is of the second reference signal and that is reported by the terminal device.

Optionally, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

Before the terminal device receives the first information and/or the second information, the terminal device further needs to report the beamforming capability or the beamforming type to the network device, and the beamforming capability or the beamforming type is used to determine the first information and/or the second information.

Optionally, in this application, the beamforming capability or the beamforming type is a receive beamforming capability or a receive beamforming type of the terminal device. For example, the receive beamforming capability or the receive beamforming type includes at least one of an analog receive beamforming type, a digit receive beamforming type, and a hybrid receive beamforming (analog and digit receive beamforming) type. Flexibility of the analog receive beamforming is poorest (the terminal device can use only one or one group of receive beams at one receiving moment), and flexibility of the digit receive beamforming is best (the terminal device may use a plurality of or a plurality of groups of receive beams at one receiving moment).

Based on the receive beamforming capability or the receive beamforming type reported by the terminal device, the network device may determine whether indication information used for the first channel is the same as indication information used for the second channel, so as to determine to set, for the terminal device, the first information and the second information for receiving the first channel and/or the second channel, and determine whether the second information is at least one of the first indicator value or the second indicator value. For example, when the first time unit in the indication information is equal to the second time unit, the beamforming capability or the beamforming type is used by the network device to set, for the terminal device, the first information for receiving the first channel and the second channel, or the first indicator value reused by the second information may be set; or when the first time unit is not equal to the second time unit, the beamforming capability or the beamforming type is used by the network device to separately set, for the terminal device, the first information for receiving the first channel and the second information for receiving the second channel, in other words, the second information is the second indicator value.

Optionally, in this application, if the receive beamforming capability or the receive beamforming type reported by the terminal device is the digit beamforming, when the first time unit is equal to the second time unit, the terminal device may receive the first channel based on the first information, and receive the second channel based on the second information; or when the first time unit is not equal to the second time unit, the terminal device may also receive the first channel based on the first information, and receive the second channel based on the second information. Certainly, when the receive beamforming capability or the receive beamforming type reported by the terminal device is the digit beamforming, the first information may also be used to receive the first channel and the second channel, and the second information is reused as the first indicator value.

The first information is carried in radio resource control RRC signaling and/or Media Access Control MAC signaling, and the second information is carried in physical layer signaling. For example, the second information may be carried in downlink control information of the physical downlink control channel. Herein, the following possibility is not excluded that in addition to the radio resource control RRC signaling and/or the Media Access Control MAC signaling, the first information is carried in physical layer signaling, for example, carried in the downlink control information of the physical downlink control channel.

The first channel may be transmitted a plurality of times on a plurality of time-frequency resources by using different beams, and receive beam indications corresponding to the first channel transmitted on the plurality of time-frequency resources may be different. Therefore, the first information used to receive the first channel may also include a plurality of pieces of indication information used to instruct the terminal device to receive the first channel in the first time unit. In this application, that the terminal device receives the second channel based on the first information includes: receiving, by the terminal device, the second channel based on the first information corresponding to the first channel that schedules the second channel. When the terminal device detects scheduling information of the second channel on the plurality of time-frequency resources for transmitting the first channel, the first channel that schedules the second channel may be the first channel transmitted on one of the plurality of time-frequency resources for transmitting the first channel. Herein, one of the plurality of time-frequency resources for transmitting the first channel may be predefined or may be configured by the network device for the terminal device.

The first time unit and the second time unit may include at least one OFDM symbol, at least one timeslot, or at least one subframe. In other words, time units included in the first time unit and the second time unit may be different or the same, and the time unit may be at least one OFDM symbol, at least one timeslot, or at least one subframe. Optionally, a granularity of the time unit may also be a unit of time at a smaller or larger granularity than the foregoing time granularity, and this is not specifically limited herein.

According to another aspect, this application further provides another information indication method. In the information indication method, a network device may send first information, and may further send second information, and the first information is information used to instruct a terminal device to receive a first channel in a first time unit, and the second information is information used to instruct the terminal device to receive a second channel in a second time unit. When the first time unit is equal to the second time unit, the first information is further used by the terminal device to receive the second channel, and the second information is a first indicator value; or when the first time unit is not equal to the second time unit, the second information is used by the terminal device to receive the second channel, and the second information is a second indicator value. When the first time unit is equal to the second time unit, data is received on the first channel and the second channel at a same receiving moment, in other words, a same time unit is multiplexed on the two channels, so that the terminal device may use a same receive beam when receiving the first channel and the second channel. In other words, the first information may be used for receiving the first channel and the second channel. Correspondingly, the second information for receiving the second channel may be used as the first indicator value. It can be learned that the method helps to use the first information and the second information in signaling to a greatest extent, so as to avoid repeated indication from the first information and the second information, and reuse the second information to indicate more other information, thereby reducing redundant information and improving signaling indication efficiency.

In an implementation, when the first channel is a physical downlink control channel, the second channel is a physical downlink shared channel, in other words, when data is received in a same time unit on the physical downlink control channel and the physical downlink shared channel, the data may be received by using a receive beam indicated by beam indication information of the physical downlink control channel (the first information is information used to instruct the terminal device to receive the first channel in the first time unit, in other words, the first information may be the beam indication information). Correspondingly, beam indication information of the physical downlink shared channel may be used as the first indicator value (the second information is information used to instruct the terminal device to receive the second channel in the second time unit, in other words, the second information may be the beam indication information).

The first indicator value may be indication information of a time domain resource location of the second channel, for example, the first indicator value may be a start symbol indication of the second channel; or the first indicator value may be indication information of a frequency domain resource location of the second channel, for example, the first indicator value may be an indication of a frequency domain resource of the first channel that needs to be removed from a frequency domain resource of the second channel; or the first indicator value may be indication information of a time domain resource location of the second channel and indication information of a frequency domain resource location of the second channel, for example, the first indicator value may be a start symbol indication of the second channel and an indication of a frequency domain resource of the first channel that needs to be removed from a frequency domain resource of the second channel; or the first indicator value may be indication information of a frequency domain resource granularity of the second channel, for example, the first indicator value may be an indication of a resource block group (Resource Block Group, RBG) size; or the first indicator value may be indication information of a time domain resource granularity of the second channel, for example, the first indicator value may be an indication of information about a time domain interval occupied by the second channel; or the first indicator value may be indication information of a time domain resource granularity of the second channel and indication information of a frequency domain resource granularity of the second channel, for example, the first indicator value may be an indication of information about a time domain interval occupied by the second channel and an indication of a resource block group (Resource Block Group, RBG) size. It can be learned that in this implementation, the second information may be used to indicate the foregoing resource location information of the second channel, the information about the time domain interval or the frequency domain resource granularity of the second channel, or the like, so as to help to receive the second channel. For example, when data is received on the first channel and the second channel in a same time unit, the second information is the first indicator value, and the first indicator value may be the foregoing indication information used to indicate additional information required in a frequency division multiplexing case, for example, a time domain resource location and/or a frequency domain resource location of the second channel, and/or a time-frequency resource scheduling granularity. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine at least one piece of information such as a time domain resource location, a frequency domain resource location, a time domain resource scheduling granularity, and a frequency domain resource scheduling granularity that are used when the second channel is received.

In an implementation, the second information may be the second indicator value, and the second indicator value may be indication information used to instruct the terminal device to receive the second channel. Alternatively, the second indicator value includes quasi-co-location QCL information between a first reference signal and a second reference signal, and the first information also includes quasi-co-location QCL information between the first reference signal and the second reference signal. In this implementation, the terminal device may receive the second channel based on the second indicator value, and the terminal device receives the first channel based on the first information. The quasi-co-location QCL information may also be referred to as quasi-co-location QCL (Quasi-Co-Location, QCL). The QCL information is used to help to describe receive side beamforming information and a receiving procedure of the terminal device.

To reduce overheads of indicating QCL information of the terminal device side by the network device side, in an optional implementation, the network device side may indicate that a QCL relationship is met between a demodulation reference signal of the first channel or the second channel and one or more of a plurality of reference signal resources previously reported by the terminal device. For example, the reference signal may be a channel state information-reference signal (Channel State Information-Reference Signal, CSI-RS). Herein, each reported index of a CSI-RS resource corresponds to one transmit and receive beam pair previously established when the CSI-RS resource is measured. It should be understood that receive beam information of two reference signals or channels that meet the QCL relationship is the same, so that the terminal device may deduce receive beam information of the first channel or the second channel based on the index of the reference signal resource.

For example, a receive beam used by the terminal device to receive a DMRS is the same as one receive beam in a plurality of CSI-RS measurement-based transmit and receive beam pairs that are previously reported by the terminal device. In other words, the QCL information may include at least one of a beam group index number of the second reference signal, a resource index number of the second reference signal, a port number of the second reference signal, and a port group number of the second reference signal that are reported by the terminal device. The second reference signal corresponds to one of the plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device. The resource index number that is of the second reference signal and that is reported by the terminal device may be one relative index number in a set including a plurality of resource index numbers reported by the terminal device. For example, if the terminal device reports four resource index numbers of the second reference signal, a resource index number that is of the second reference signal and that is reported by the terminal device is any one of {0, 1, 2, 3}.

Optionally, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

Before sending the first information and/or the second information, the network device may further receive the beamforming capability or the beamforming type reported by the terminal device, and the network device determines the first information and/or the second information based on the beamforming capability or the beamforming type. Optionally, in this application, the beamforming capability or the beamforming type is a receive beamforming capability or a receive beamforming type of the terminal device. For example, the receive beamforming capability or the receive beamforming type includes at least one of an analog receive beamforming type, a digit receive beamforming type, and a hybrid receive beamforming (analog and digit receive beamforming) type. Flexibility of the analog receive beamforming is poorest (the terminal device can use only one or one group of receive beams at one receiving moment), and flexibility of the digit receive beamforming is best (the terminal device may use a plurality of or a plurality of groups of receive beams at one receiving moment).

Based on the receive beamforming capability or the receive beamforming type reported by the terminal device, the network device may determine whether indication information used for the first channel is the same as indication information used for the second channel, so as to determine to set, for the terminal device, the first information and the second information for receiving the first channel and/or the second channel, and determine whether the second information is at least one of the first indicator value, the second indicator value, or the like. For example, when the first time unit in the indication information is equal to the second time unit, the beamforming capability or the beamforming type is used by the network device to set, for the terminal device, the first information for receiving the first channel and the second channel, or the first indicator value reused by the second information may be set; or when the first time unit in the indication information is not equal to the second time unit, the beamforming capability or the beamforming type is used by the network device to separately set, for the terminal device, the first information for receiving the first channel and the second information for receiving the second channel, in other words, the second information is the second indicator value.

The first information is carried in radio resource control RRC signaling and/or Media Access Control MAC signaling, and the second information is carried in physical layer signaling.

That when the first time unit is equal to the second time unit, the first information is further used by the terminal device to receive the second channel in the second time unit is specifically: the first information corresponding to the first channel that schedules the second channel is used by the terminal device to receive the second channel in the second time unit.

The first time unit and the second time unit may include at least one OFDM symbol, at least one timeslot, or at least one subframe. In other words, time units included in the first time unit and the second time unit may be different or the same, and the time unit may be at least one OFDM symbol, at least one timeslot, or at least one subframe.

According to still another aspect, an embodiment of the present invention further provides a terminal device. The terminal device has functions of implementing terminal device behavior in the foregoing method examples. The functions may be implemented by using hardware, or may be implemented by executing corresponding software by hardware. The hardware or software includes one or more units or modules corresponding to the foregoing functions.

In a possible design, the terminal device may include a receiving unit and a sending unit, and the receiving unit and the sending unit are configured to support communication between the terminal device and another device. The terminal device may further include a storage unit. The storage unit is configured to be coupled to the receiving unit and the sending unit, and the storage unit stores a program instruction and data that are necessary for the terminal device. For example, the receiving unit and the sending unit may be a transceiver, and the storage unit may be a memory.

According to still another aspect, an embodiment of the present invention provides a network device. The network device has functions of implementing network device behavior in the foregoing method examples. The functions may be implemented by using hardware, or may be implemented by executing corresponding software by hardware. The hardware or software includes one or more units or modules corresponding to the foregoing functions.

In a possible design, a structure of the network device includes a processing unit, a receiving unit, and a sending unit, and the processing unit is configured to support the network device in performing a corresponding function in the foregoing method. The receiving unit and the sending unit are configured to support communication between the network device and another device. The network device may further include a storage unit. The storage unit is configured to be coupled to the processing unit, the receiving unit, and the sending unit, and the storage unit stores a program instruction and data that are necessary for the network device. For example, the processing unit may be a processor, the receiving unit and the sending unit may be a transceiver, and the storage unit may be a memory.

According to still another aspect, an embodiment of the present invention provides a communications system, and the system includes the terminal device and/or the network device according to the foregoing aspects. In possible design, the system may further include another device that interacts with the terminal device or the network device and that is in the solution provided in this embodiment of the present invention.

According to still another aspect, an embodiment of the present invention provides a computer storage medium, configured to store computer software instructions used by the foregoing terminal device. The computer storage medium includes a program designed to execute the foregoing aspects.

According to still another aspect, an embodiment of the present invention provides a computer storage medium, configured to store computer software instructions used by the foregoing network device. The computer storage medium includes a program designed to execute the foregoing aspects.

According to still another aspect, this application further provides a computer program product that includes an instruction. When the computer program product runs on a computer, the computer performs the method in the foregoing aspects.

According to still another aspect, this application provides a chip system, and the chip system includes a processor that is used by a terminal device to implement functions related in the foregoing aspects, for example, generate or process data and/or information related in the foregoing method. In a possible design, the chip system further includes a memory, and the memory is configured to store a program instruction and data that are necessary for the terminal device. The chip system may include a chip, or may include a chip and another discrete device.

According to still another aspect, this application provides a chip system, and the chip system includes: a processor, configured to support a network device in implementing functions related in the foregoing aspects, for example, receive or process data and/or information related in the foregoing method. In a possible design, the chip system further includes a memory, and the memory is configured to store a program instruction and data that are necessary for the network device. The chip system may include a chip, or may include a chip and another discrete device.

DESCRIPTION OF EMBODIMENTS

The following describes the embodiments of the present invention with reference to the accompanying drawings in the embodiments of the present invention.

Communication in the embodiments of the present invention may be between a base station and a terminal, or may be between a base station and a base station, for example, between a macro base station and a micro base station, or may be communication between a terminal and a terminal, such as communication in a D2D network. In the embodiments of the present invention, the communication between a base station and user equipment is used as an example. The user equipment may be a wireless terminal or a wired terminal. The wireless terminal may be a device that provides a user with voice and/or data connectivity, a handheld device with a wireless connection function, or another processing device connected to a wireless modem, and may communicate with one or more core networks by using a radio access network (RAN). For example, the user equipment may be a mobile terminal such as a mobile phone (or referred to as a "cellular" phone) and a computer having a mobile terminal, or may be a portable, pocket-sized, handheld, computer built-in, or in-vehicle mobile apparatus, such as a personal communications service (PCS) telephone, a cordless telephone set, a Session Initiation Protocol (SIP) phone, a wireless local loop (WLL) station, or a personal digital assistant (PDA) that exchanges voice and/or data with the radio access network. Optionally, the user equipment may also be referred to as a mobile station (MS), a mobile terminal, a subscriber unit (SU), a subscriber station (SS), a mobile station (MB), a remote station (RS), an access point (AP), a remote terminal (RT), an access terminal (AT), a user terminal (UT), a user agent (UA), a User Device (UD), or the like, and this is not limited in this application.

In this application, a network device may include a base station, a Transmission Reception Point (TRP), or a radio frequency unit such as a remote radio unit (RRU). The base station may be a device that communicates with a terminal by using one or more sectors on an air interface in an access network, and may coordinate attribute management of the air interface. For example, the base station may be a base station in GSM or CDMA: a base transceiver station (BTS), or may be a base station in WCDMA: a NodeB, or may be an evolved NodeB in LTE: an eNB or an e-NodeB (evolutional Node B), or may be a base station in a 5G system, a base station in a future network, or the like. This is not limited in this application. Optionally, the base station may be a relay device, or another network element device having a base station function.

Figure 1:
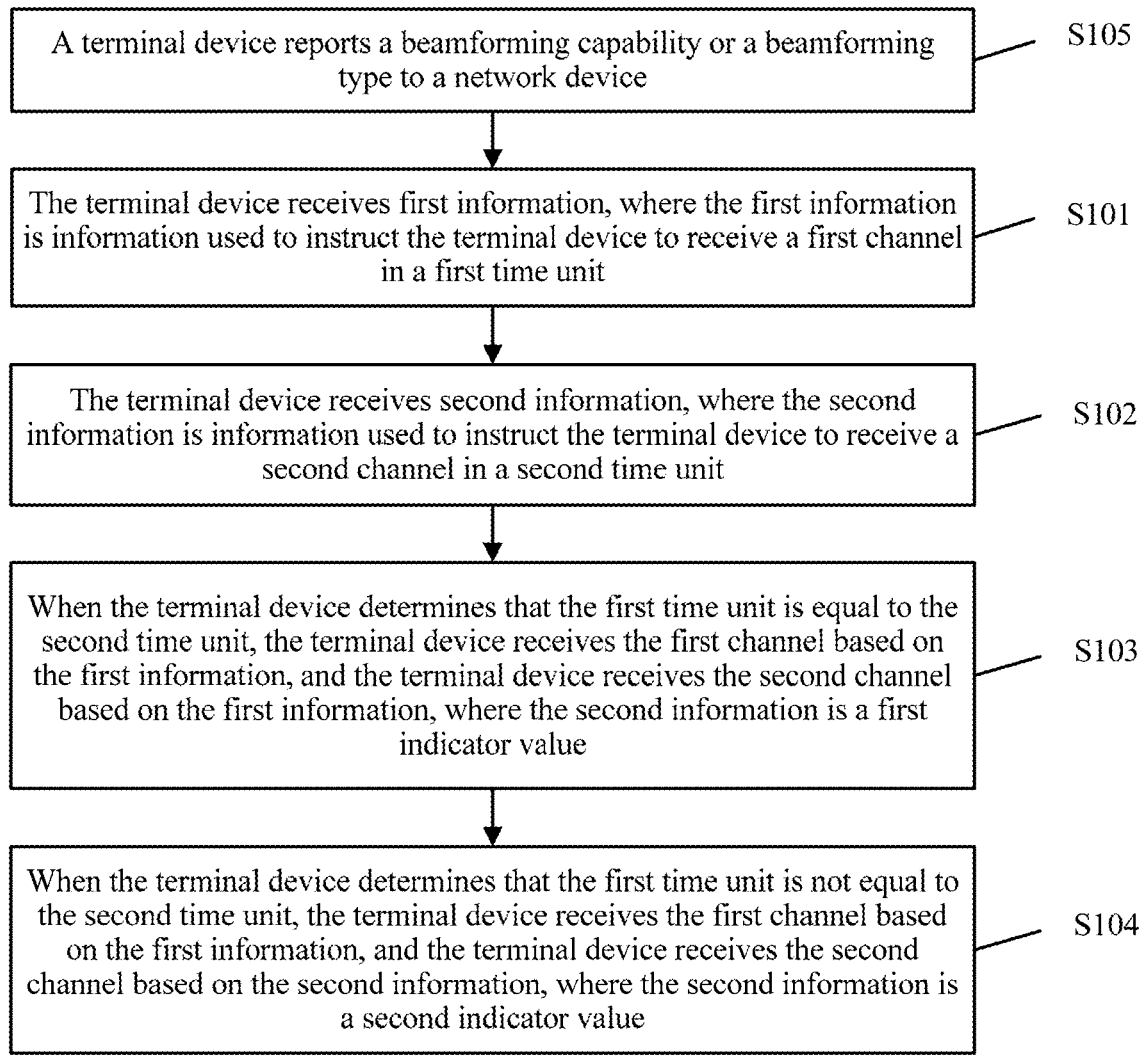
FIG. 1 is a schematic flowchart of an information indication method according to an embodiment of the present invention.

Referring to FIG. 1, FIG. 1 is a schematic flowchart of an information indication method according to an embodiment of the present invention. As shown in FIG. 1, the information indication method includes the following steps.

S101. A terminal device receives first information, where the first information is information used to instruct the terminal device to receive a first channel in a first time unit.

S102. The terminal device receives second information, where the second information is information used to instruct the terminal device to receive a second channel in a second time unit.

S103. When the first time unit is equal to the second time unit, the terminal device receives the first channel based on the first information, and the terminal device receives the second channel based on the first information, where the second information is a first indicator value.

S104. When the first time unit is not equal to the second time unit, the terminal device receives the first channel based on the first information, and the terminal device receives the second channel based on the second information, where the second information is a second indicator value.

The first information or the second information may include beam indication information, and the terminal device may obtain receive beam information of the first channel or the second channel based on the beam indication information, so as to reduce time wasted by the terminal device to scan a receive beam, thereby saving power.

In an implementation, the first information may be carried in radio resource control RRC signaling and/or Media Access Control MAC signaling, the second information may be carried in physical layer signaling, the first channel may be a physical downlink control channel (Physical Downlink Control Channel, PDCCH), and the second channel may be a physical downlink shared channel (Physical Downlink Shared Channel, PDSCH). To be specific, the first information of the physical downlink control channel may be delivered to the terminal device by using RRC signaling and/or layer 2 signaling. The first information may include a beam indication field of the first channel. The second information of the PDSCH may be delivered to the terminal device by using physical layer signaling, for example, downlink control information (Downlink Control Information, DCI), and the downlink control information includes a beam indication field of the second channel to indicate the second information.

When the first time unit is equal to the second time unit, in other words, the PDCCH and the PDSCH are sent in a frequency division multiplexing manner, the terminal device may reuse beam indication information of the PDCCH when receiving the PDSCH, and the beam indication field of the PDSCH in the saved DCI is used to indicate other information. In other words, the second information may be the first indicator value. The first indicator value is indication information of a time domain resource location of the second channel; or the first indicator value is indication information of a frequency domain resource location of the second channel; or the first indicator value is indication information of a time domain resource location of the second channel and indication information of a frequency domain resource location of the second channel; or the first indicator value is indication information of a frequency domain resource granularity of the second channel; or the first indicator value is indication information of a time domain resource granularity of the second channel; or the first indicator value is indication information of a time domain resource granularity of the second channel and indication information of a frequency domain resource granularity of the second channel. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine at least one piece of information such as a time domain resource location, a frequency domain resource location, a time domain resource scheduling granularity, and a frequency domain resource scheduling granularity that are used when the second channel is received. In other words, the terminal device obtains, based on the first indicator value of the second information, information about a time domain interval used when the PDSCH is received.

For example, when data is received on the first channel and the second channel in a same time unit, in other words, the first channel and the second channel are sent in a frequency division multiplexing manner, the beam indication field of the PDSCH in the DCI is used as an indication of information about a time domain interval of the PDSCH or an indication of an RBG size. The indication of the information about the time domain interval of the PDSCH may be a start symbol indication of the PDSCH and/or an information indication of a PDCCH resource that needs to be removed from a scheduled frequency domain resource of the PDSCH.

That the beam indication field of the PDSCH is used as the start symbol indication of the PDSCH may be shown in Table 1.

TABLE 1

| Information indicator value | Message |
| --- | --- |
| [00] | A PDSCH start symbol index value is 0 |
| [01] | A PDSCH start symbol index value is 1 |
| [10] | A PDSCH start symbol index value is 2 |
| [11] | A PDSCH start symbol index value is 3 |

In this application, the time unit may include at least one OFDM symbol, at least one timeslot, or at least one subframe. For example, in Table 1, the beam indication may be interpreted as follows: A start symbol of the PDSCH may be an OFDM symbol with a PDSCH start symbol index value of 0, an OFDM symbol with a PDSCH start symbol index value of 1, an OFDM symbol with a PDSCH start symbol index value of 2, or an OFDM symbol with a PDSCH start symbol index value of 3. Specifically, the terminal device determines the start symbol of the PDSCH based on a value of the beam indication field of the PDSCH in the DCI.

More generally, that the beam indication field of the PDSCH is used as the start symbol indication of the PDSCH may be shown in Table 2.

TABLE 2

| Information indicator value | Message |
| --- | --- |
| [00] | A PDSCH start symbol index value is m |
| [01] | A PDSCH start symbol index value is n |
| [10] | A PDSCH start symbol index value is k |
| [11] | A PDSCH start symbol index value is p |

In Table 2, m, n, k, and p are any integers greater than or equal to 0 and are less than or equal to K. Herein, K is a total quantity of OFDM symbols included in each timeslot.

That the beam indication field of the PDSCH is used as an information indication of a PDCCH resource that needs to be removed from a scheduled frequency domain resource of the PDSCH may be shown in Table 3.

TABLE 3

| Information indicator value | Message |
| --- | --- |
| [00] | PDCCH resource 1 removed from a PDSCH frequency domain resource |
| [01] | PDCCH resource 2 removed from a PDSCH frequency domain resource |
| [10] | PDCCH resource 3 removed from a PDSCH frequency domain resource |
| [11] | PDCCH resource 4 removed from a PDSCH frequency domain resource |

In Table 3, a frequency domain resource may be in a unit of a sub-band or a physical resource block PRB. For example, the PDCCH resource 1 removed from the PDSCH frequency domain resource is a sub-band 1, the PDCCH resource 2 removed from the PDSCH frequency domain resource is a sub-band 2, the PDCCH resource 3 removed from the PDSCH frequency domain resource is a sub-band 3, and the PDCCH resource 4 removed from the PDSCH frequency domain resource is a sub-band 4. Specifically, information about a sub-band may be notified to the terminal device in a predefined manner or a higher layer signaling notification manner, so as to notify the terminal device of a frequency domain index number of a PDCCH resource in a frequency domain resource of the PDSCH. Alternatively, the information about the sub-band may be notified by a network device to the terminal device in a notification manner with other signaling, and the other signaling herein optionally includes layer 2 signaling, physical layer signaling, and/or the like.

That the beam indication field of the PDSCH is used as an information indication of a frequency domain resource scheduling granularity of the PDSCH such as an information indication of an RBG size may be shown in Table 4.

TABLE 4

| Information indicator value Information Indicator | Message |
| --- | --- |
| [00] | A PDSCH RBG size is 2 |
| [01] | A PDSCH RBG size is 4 |
| [10] | A PDSCH RBG size is 8 |
| [11] | A PDSCH RBG size is 16 |

In addition, the beam indication field of the PDSCH may also be used as an indication of other information, for example, an indication of other related information required when the first channel and the second channel are received in a same time unit. This is not limited in this embodiment of the present invention.

It can be learned that when the terminal device determines that the first time unit is equal to the second time unit, in other words, the PDCCH and the PDSCH are sent in a frequency division multiplexing manner, the beam indication information of the PDCCH may be interpreted as beam indication information of the PDSCH, and the beam indication information of the PDSCH in the DCI may be interpreted according to any one of Table 1 to Table 4.

In addition, when the terminal device determines that the first time unit is not equal to the second time unit, in other words, the PDCCH and the PDSCH are not multiplexed in a frequency division multiplexing manner, beam indication information of the PDSCH in the DCI is normally interpreted by the terminal device as indication information related to a receive beam of the PDSCH. For example, the terminal device may interpret, according to Table 5, the beam indication field of the PDSCH in the DCI, in other words, the second information.

TABLE 5

| Information indicator value | Message |
| --- | --- |
| [00] | A reference signal resource group number 0 reported by the terminal device, or a beam group number 0 reported by the terminal device, or a reference signal resource index number 0 reported by the terminal device, or a reference signal port group number 0 reported by the terminal device, or a reference signal port number 0 reported by the terminal device |
| [01] | A reference signal resource group number 1 reported by the terminal device, or a beam group number 0 reported by the terminal device, or a reference signal resource index number 1 reported by the terminal device, or a reference signal port group number 1 reported by the terminal device, or a reference signal port number 01 reported by the terminal device |
| [10] | A reference signal resource group number 2 reported by the terminal device, or a beam group number 0 reported by the terminal device, or a reference signal resource index number 2 reported by the terminal device, or a reference signal port group number 2 reported by the terminal device, or a reference signal port number 2 reported by the terminal device |
| [11] | A reference signal resource group number 3 reported by the terminal device, or a beam group number 0 reported by the terminal device, or a reference signal resource index number 3 reported by the terminal device, or a reference signal port group number 3 reported by the terminal device, or a reference signal port number 3 reported by the terminal device |

In Table 5, the reference signal resource group number or the beam group number or the reference signal resource index number or the reference signal port group number or the reference signal port number reported by the terminal device is a beam pair identifier or a reference signal resource index number in a latest updated CSI report result of the terminal device. The terminal device interprets the information, and then may learn of receive beam auxiliary information used by the terminal device to receive the PDSCH, and the beam indication information may be used for indication in a QCL form. Herein, the beam group index number that is of a reference signal and that is reported by the terminal device is equivalent to one resource set index number that is of the reference signal and that is reported by the terminal device. The resource index number that is of the reference signal and that is reported by the terminal device may be one relative index number in a set including a plurality of resource index numbers reported by the terminal device. For example, if the terminal device reports four resource index numbers of the reference signal, a relative resource index number that is of the reference signal and that is reported by the terminal device is any one of the four resource index numbers of the reference signal, such as {0, 1, 2, 3}.

The first information may also be indicated by using the same indication information as the foregoing Table 5, or in any other indication manner. This is not limited herein.

The second information is the second indicator value, the second indicator value includes quasi-co-location QCL information between a first reference signal and a second reference signal. The first reference signal is used to demodulate the second channel, and the second reference signal is a reference signal different from the first reference signal. The QCL information may include at least one of a beam group index number of the second reference signal, a resource index number of the second reference signal, a port number of the second reference signal, and a port group number of the second reference signal that are reported by the terminal device. The second reference signal corresponds to one of a plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device.

In addition, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

Similarly, the first information may also include quasi-co-location QCL information between the first reference signal and the second reference signal. The terminal device may determine a receive beam of the PDCCH based on the quasi-co-location QCL information. The first reference signal is used to demodulate the first channel, and the second reference signal is a reference signal different from the first reference signal.

The information used to instruct the terminal device to receive the first channel may include receiving indication information of a plurality of first channels. In this application, the first information is receiving indication information corresponding to the first channel that schedules the second channel. To be specific, the first information used by the terminal device to receive the second channel is receiving indication information corresponding to the first channel that schedules the second channel. For example, the first channel may be transmitted a plurality of times on a plurality of time-frequency resources by using different beams, and receive beam indications corresponding to the first channel transmitted on the plurality of time-frequency resources may be different. Therefore, the first information used to receive the first channel may also include a plurality of pieces of indication information used to instruct the terminal device to receive the first channel in the first time unit. In this application, the first channel is a channel that schedules the second channel. Correspondingly, that the terminal device receives the second channel based on the first information includes: receiving, by the terminal device, the second channel based on the first information corresponding to the first channel that schedules the second channel. When the terminal device detects scheduling information of the second channel on the plurality of time-frequency resources for transmitting the first channel, the first channel that schedules the second channel may be the first channel transmitted on one of the plurality of time-frequency resources for transmitting the first channel. Herein, one of the plurality of time-frequency resources for transmitting the first channel may be predefined or may be configured by the network device for the terminal device. When the PDSCH and the PDCCH are sent in a frequency division multiplexing manner, the terminal device receives the PDSCH and the PDCCH based on the beam indication information corresponding to the PDCCH that schedules the PDSCH.

Optionally, in the information indication method shown in FIG. 1, before receiving the first information, the terminal device may further perform the following step:

S105. The terminal device reports a beamforming capability or a beamforming type to a network device.

The beamforming capability or the beamforming type is used by the network device to determine the first information and/or the second information based on the beamforming capability or the beamforming type.

Optionally, in this application, the beamforming capability or the beamforming type is a receive beamforming capability or a receive beamforming type of the terminal device. For example, the receive beamforming capability or the receive beamforming type includes at least one of an analog receive beamforming type, a digit receive beamforming type, and a hybrid receive beamforming (analog and digit receive beamforming) type. Flexibility of the analog receive beamforming is poorest (the terminal device can use only one or one group of receive beams at one receiving moment), and flexibility of the digit receive beamforming is best (the terminal device may use a plurality of or a plurality of groups of receive beams at one receiving moment).

Based on the receive beamforming capability or the receive beamforming type reported by the terminal device, the network device may determine whether indication information used for the first channel is the same as indication information used for the second channel, so as to determine to set, for the terminal device, the first information and the second information for receiving the first channel and/or the second channel, and determine whether the second information is at least one of the first indicator value, the second indicator value, or the like. For example, when the first time unit in the indication information is equal to the second time unit, the beamforming capability or the beamforming type is used by the network device to set, for the terminal device, the first information for receiving the first channel and the second channel, or the first indicator value reused by the second information may be set; or when the first time unit is not equal to the second time unit, the beamforming capability or the beamforming type is used by the network device to separately set, for the terminal device, the first information for receiving the first channel and the second information for receiving the second channel, in other words, the second information is the second indicator value.

Optionally, in an implementation, if the receive beamforming capability or the receive beamforming type reported by the terminal device is the digit beamforming, when the first time unit is equal to the second time unit, the terminal device may receive the first channel based on the first information, and receive the second channel based on the second information; or when the first time unit is not equal to the second time unit, the terminal device may also receive the first channel based on the first information, and receive the second channel based on the second information. Certainly, the foregoing first information and/or second information setting method may also be used when the receive beamforming capability or the receive beamforming type reported by the terminal device is the digit beamforming. This is not limited in this embodiment of the present invention.

It can be learned that in this embodiment of the present invention, the terminal device may determine a receive beam of the first channel and a receive beam of the second channel by using the first information and the second information or by using the first information, so as to avoid power consumption caused by searching for a receive beam for a long time. In addition, when the time unit for receiving the first channel is equal to the time unit for receiving the second channel, in other words, the first channel and the second channel are sent in a frequency division multiplexing manner, same receiving indication information may be used to receive the first channel and the second channel. The receiving indication information may be determined based on the first information, and the second information may be reused as an indication of other information. For example, the second information may be reused as other additional information that needs to be indicated in a frequency division multiplexing case, so as to avoid allocating new additional information, such as an additional bit in DCI, to indicate the other additional information, thereby reducing signaling overheads.

Figure 2:
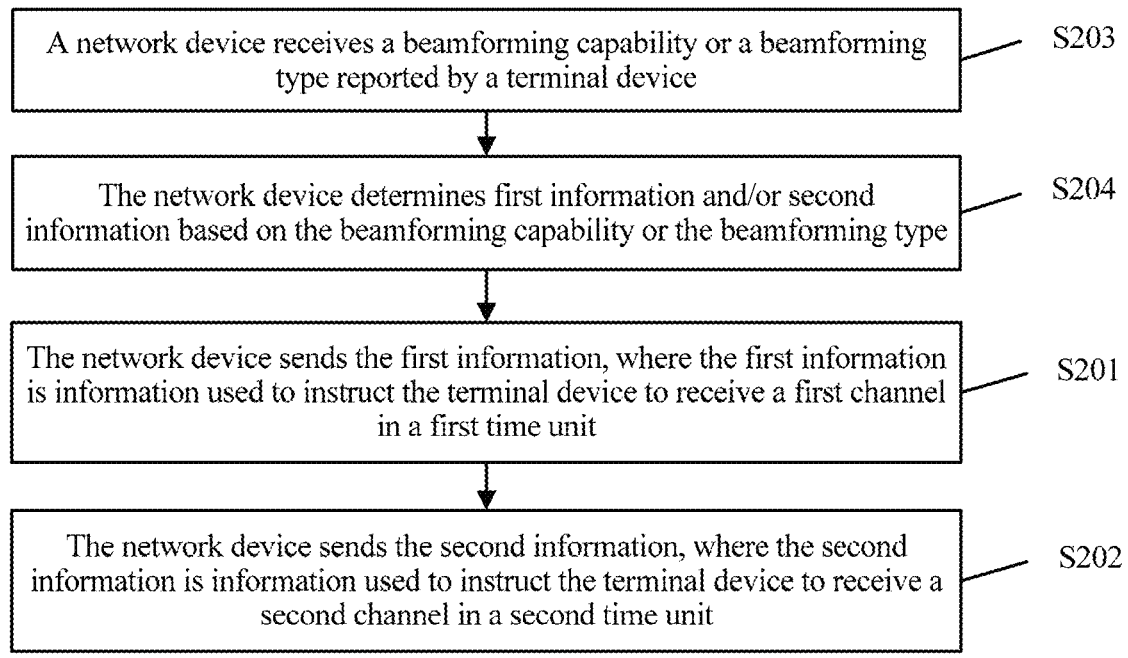
FIG. 2 is a schematic flowchart of another information indication method according to an embodiment of the present invention.

Referring to FIG. 2, FIG. 2 is a schematic flowchart of another information indication method according to an embodiment of the present invention. As shown in FIG. 2, the information indication method may include the following steps:

S201. A network device sends first information, where the first information is information used to instruct a terminal device to receive a first channel in a first time unit.

S202. The network device sends second information, where the second information is information used to instruct the terminal device to receive a second channel in a second time unit.

The information indication method may further include the following steps:

S203. The network device receives a beamforming capability or a beamforming type reported by the terminal device.

S204. The network device determines the first information and/or the second information based on the beamforming capability or the beamforming type.

The beamforming capability or the beamforming type is a receive beamforming capability or a receive beamforming type of the terminal device. For example, the receive beamforming capability or the receive beamforming type includes at least one of an analog receive beamforming type, a digit receive beamforming type, and a hybrid receive beamforming (analog and digit receive beamforming) type. Flexibility of the analog receive beamforming is poorest (the terminal device can use only one or one group of receive beams at one receiving moment), and flexibility of the digit receive beamforming is best (the terminal device can use only a plurality of or a plurality of groups of receive beams at one receiving moment).

Based on the receive beamforming capability or the receive beamforming type reported by the terminal device, the network device may determine whether indication information used for the first channel is the same as indication information used for the second channel, so as to determine to set, for the terminal device, the first information and the second information for receiving the first channel and/or the second channel, and determine whether the second information is at least one of a first indicator value, a second indicator value, or the like. For example, when the first time unit in the indication information is equal to the second time unit, the beamforming capability or the beamforming type is used by the network device to set, for the terminal device, the first information for receiving the first channel and the second channel, or the first indicator value reused by the second information may be set; or when the first time unit is not equal to the second time unit, the beamforming capability or the beamforming type is used by the network device to separately set, for the terminal device, the first information for receiving the first channel and the second information for receiving the second channel, in other words, the second information is the second indicator value.

When the first time unit is equal to the second time unit, the first information is further used by the terminal device to receive the second channel, and the second information is the first indicator value; or when the first time unit is not equal to the second time unit, the second information is used by the terminal device to receive the second channel, and the second information is the second indicator value.

The first information or the second information may include beam indication information, and the terminal device may obtain receive beam information of the first channel or the second channel based on the beam indication information, so as to reduce time wasted by the terminal device to scan a receive beam, thereby saving power.

In an implementation, the first information may be carried in radio resource control RRC signaling and/or Media Access Control MAC signaling, the second information may be carried in physical layer signaling, the first channel may be a physical downlink control channel (Physical Downlink Control Channel, PDCCH), and the second channel may be a physical downlink shared channel (Physical Downlink Shared Channel, PDSCH). To be specific, the first information of the physical downlink control channel may be delivered to the terminal device by using RRC signaling and/or layer 2 signaling. The first information may include a beam indication field of the first channel. The second information of the PDSCH may be delivered to the terminal device by using physical layer signaling, for example, downlink control information (Downlink Control Information, DCI), and the downlink control information includes a beam indication field of the second channel to indicate the second information.

When the first time unit is equal to the second time unit, in other words, the PDCCH and the PDSCH are sent in a frequency division multiplexing manner, the terminal device may reuse beam indication information of the PDCCH when receiving the PDSCH, and the beam indication field of the PDSCH in the saved DCI is used to indicate other information. In other words, the second information may be the first indicator value. The first indicator value is indication information of a time domain resource location of the second channel; or the first indicator value is indication information of a frequency domain resource location of the second channel; or the first indicator value is indication information of a time domain resource location of the second channel and indication information of a frequency domain resource location of the second channel; or the first indicator value is indication information of a frequency domain resource granularity of the second channel; or the first indicator value is indication information of a time domain resource granularity of the second channel; or the first indicator value is indication information of a time domain resource granularity of the second channel and indication information of a frequency domain resource granularity of the second channel. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine at least one piece of information such as a time domain resource location, a frequency domain resource location, a time domain resource scheduling granularity, and a frequency domain resource scheduling granularity that are used when the second channel is received. In other words, the terminal device may obtain, based on the first indicator value of the second information, information about a time domain interval used when the PDSCH is received.

For example, when data is received on the first channel and the second channel in a same time unit, in other words, the first channel and the second channel are sent in a frequency division multiplexing manner, the beam indication field of the PDSCH in the DCI is used as an indication of information about a time domain interval of the PDSCH or an indication of an RBG size. The indication of the information about the time domain interval of the PDSCH may be a start symbol indication of the PDSCH and/or an information indication of a PDCCH resource that needs to be removed from a frequency domain resource of the PDSCH.

That the beam indication field of the PDSCH is used as the start symbol indication of the PDSCH may be shown in Table 1. In this application, the time unit may include at least one OFDM symbol, at least one timeslot, or at least one subframe. For example, in Table 1, a start symbol of the PDSCH may be an OFDM symbol with a PDSCH start symbol index value of 0, an OFDM symbol with a PDSCH start symbol index value of 1, an OFDM symbol with a PDSCH start symbol index value of 2, or an OFDM symbol with a PDSCH start symbol index value of 3. Specifically, the terminal device determines the start symbol of the PDSCH based on a value of the beam indication field of the PDSCH in the DCI.

More generally, that the beam indication field of the PDSCH is used as the start symbol indication of the PDSCH may be shown in Table 2. In Table 2, m, n, k, and p are any integers greater than or equal to 0 and are less than or equal to K. Herein, K is a total quantity of OFDM symbols included in each timeslot.

That the beam indication field of the PDSCH is used as an information indication of a PDCCH resource that needs to be removed from a scheduled frequency domain resource of the PDSCH may be shown in Table 3. In Table 3, a frequency domain resource may be in a unit of a sub-band or a physical resource block PRB. For example, the PDCCH resource 1 removed from the PDSCH frequency domain resource is a sub-band 1, the PDCCH resource 2 removed from the PDSCH frequency domain resource is a sub-band 2, the PDCCH resource 3 removed from the PDSCH frequency domain resource is a sub-band 3, and the PDCCH resource 4 removed from the PDSCH frequency domain resource is a sub-band 4. Specifically, information about a sub-band may be notified to the terminal device in a predefined manner or a higher layer signaling notification manner, so as to notify the terminal device of a frequency domain index number of a PDCCH resource in a frequency domain resource of the PDSCH. Alternatively, the information about the sub-band may be notified by the network device to the terminal device in a notification manner with other signaling, and the other signaling herein optionally includes layer 2 signaling, physical layer signaling, and/or the like.

That the beam indication field of the PDSCH is used as an information indication of a frequency domain resource scheduling granularity of the PDSCH such as an information indication of an RBG size may be shown in Table 4. In addition, the beam indication field of the PDSCH may also be used as an indication of other information, for example, an indication of other related information required when the first channel and the second channel are received in a same time unit. This is not limited in this embodiment of the present invention.

It can be learned that when the PDCCH and the PDSCH are sent in a frequency division multiplexing manner, the beam indication information of the PDCCH may be interpreted as beam indication information of the PDSCH, and the network device may use the beam indication information of the PDSCH in the DCI to indicate content of Table 1 to Table 4, thereby reducing signaling overheads.

In addition, when the first time unit is not equal to the second time unit, in other words, the PDCCH and the PDSCH are not multiplexed in a frequency division multiplexing manner, beam indication information of the PDSCH in the DCI is normally interpreted by the terminal device as indication information related to a receive beam. As shown in Table 5, the beam indication field of the PDSCH in the DCI may be used to indicate a reference signal resource group number or a beam group number or a reference signal resource index number or a reference signal port group number. The reference signal resource group number or the beam group number or the reference signal resource index number or the reference signal port group number is a beam pair identifier or a CSI-RS resource index number in a latest updated CSI report result of the terminal device. The terminal device interprets the information, and then may learn of receive beam auxiliary information used by the terminal device to receive the PDSCH, and the beam indication information may be used for indication in a QCL form. Herein, the beam group index number that is of a reference signal and that is reported by the terminal device is equivalent to one resource set index number that is of the reference signal and that is reported by the terminal device. The resource index number that is of the reference signal and that is reported by the terminal device may be one relative index number in a set including a plurality of resource index numbers reported by the terminal device. For example, if the terminal device reports four absolute resource index numbers $\{1, 5, 7, 9\}$ of the reference signal, based on the report result of the terminal device, a relative resource index number of the reference signal is any one of $\{0, 1, 2, 3\}$. The relative resource index number 0 corresponds to the resource index number 1 that is of the reference signal and that is reported by the terminal device. The relative resource index number 1 corresponds to the resource index number 5 that is of the reference signal and that is reported by the terminal device. The relative resource index number 2 corresponds to the resource index number 7 that is of the reference signal and that is reported by the terminal device. The relative resource index number 3 corresponds to the resource index number 9 that is of the reference signal and that is reported by the terminal device.

When the second information is the second indicator value, the second indicator value includes quasi-co-location QCL information between a first reference signal and a second reference signal. The first reference signal is used to demodulate the second channel, and the second reference signal is a reference signal different from the first reference signal. The QCL information may include at least one of a beam group index number of the second reference signal, a resource index number of the second reference signal, a port number of the second reference signal, and a port group number of the second reference signal that are reported by the terminal device. The second reference signal corresponds to one of a plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device.

In addition, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

Similarly, the first information may also include quasi-co-location QCL information between the first reference signal and the second reference signal. The terminal device may determine a receive beam of the PDCCH based on the quasi-co-location QCL information. The first reference signal is used to demodulate the first channel, and the second reference signal is a reference signal different from the first reference signal.

The information used to instruct the terminal device to receive the first channel may include receiving indication information of a plurality of first channels. In this application, the first information is receiving indication information corresponding to the first channel that schedules the second channel. To be specific, the first information used by the terminal device to receive the second channel is receiving indication information corresponding to the first channel that schedules the second channel, and is not receiving indication information corresponding to another first channel. For example, there are a plurality of PDCCHs, and correspondingly, there are a plurality of pieces of beam indication information. When the PDSCH and the PDCCH are sent in a frequency division multiplexing manner, the terminal device receives the PDSCH and the PDCCH based on the beam indication information corresponding to the PDCCH that schedules the PDSCH.

It can be learned that in this embodiment of the present invention, the network device may notify the terminal device of a receive beam of the first channel and a receive beam of the second channel by using the first information and the second information, so as to avoid power consumption caused by searching for a receive beam by the terminal device for a long time. In addition, when the time unit for receiving the first channel is equal to the time unit for receiving the second channel, in other words, the first channel and the second channel are sent in a frequency division multiplexing manner, same receiving indication information may be used to receive the first channel and the second channel. The receiving indication information may be determined based on the first information, and the second information may be used as an indication of other information. For example, the second information may be reused as other additional information that needs to be indicated in a frequency division multiplexing case, so as to avoid allocating new additional information, such as an additional bit in DCI, to indicate the other additional information. Therefore, this embodiment of the present invention helps to reduce signaling overheads.

Figure 3:
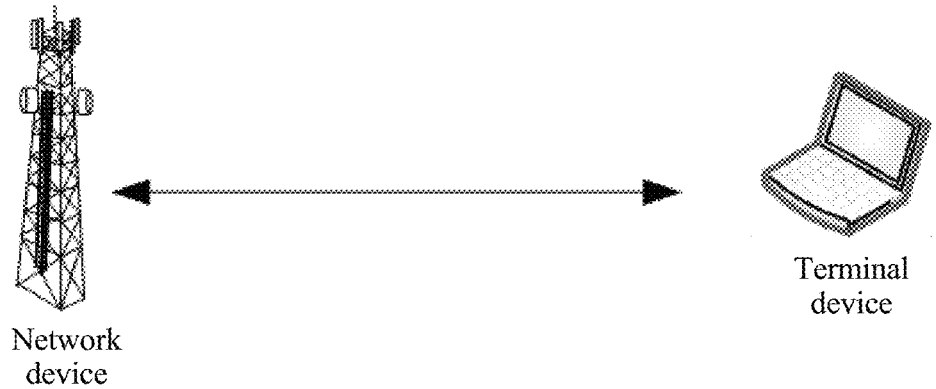
FIG. 3 is a schematic structural diagram of a wireless communications system according to an embodiment of the present invention.
Figure 4A:
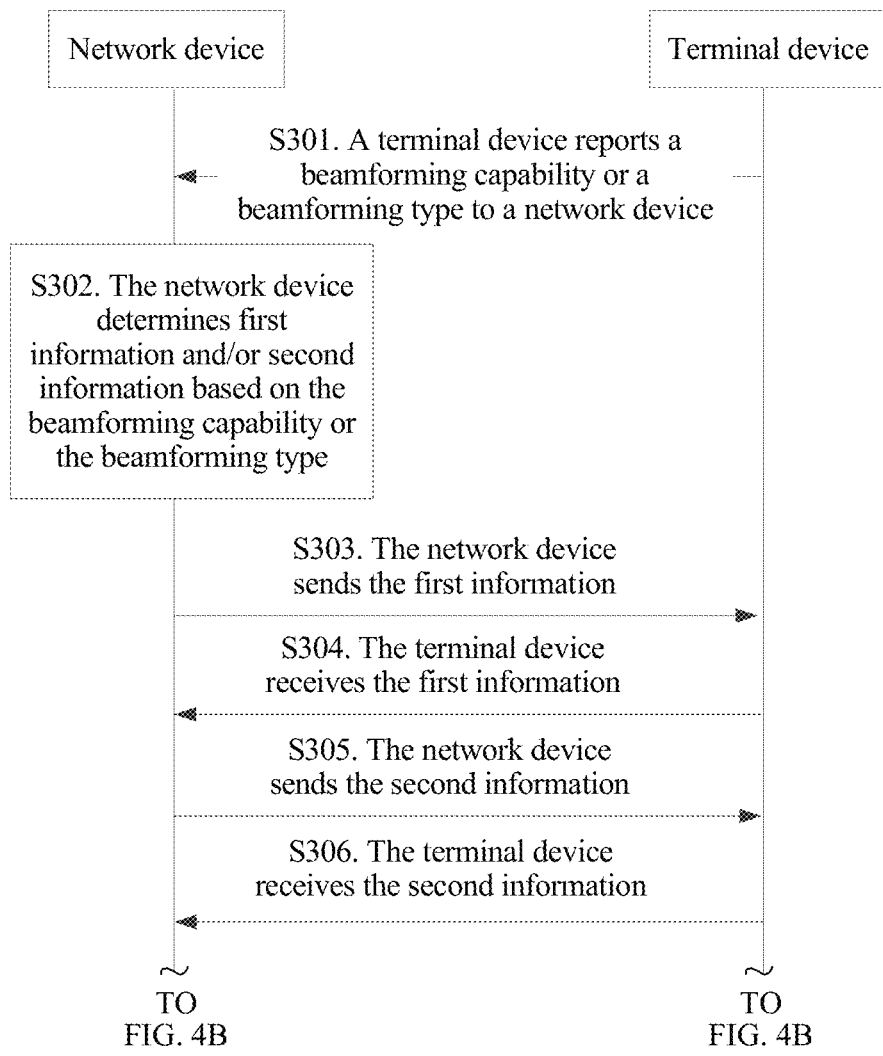
FIG. 4A and FIG. 4B are a schematic flowchart of still another information indication method according to an embodiment of the present invention.
Figure 4B:
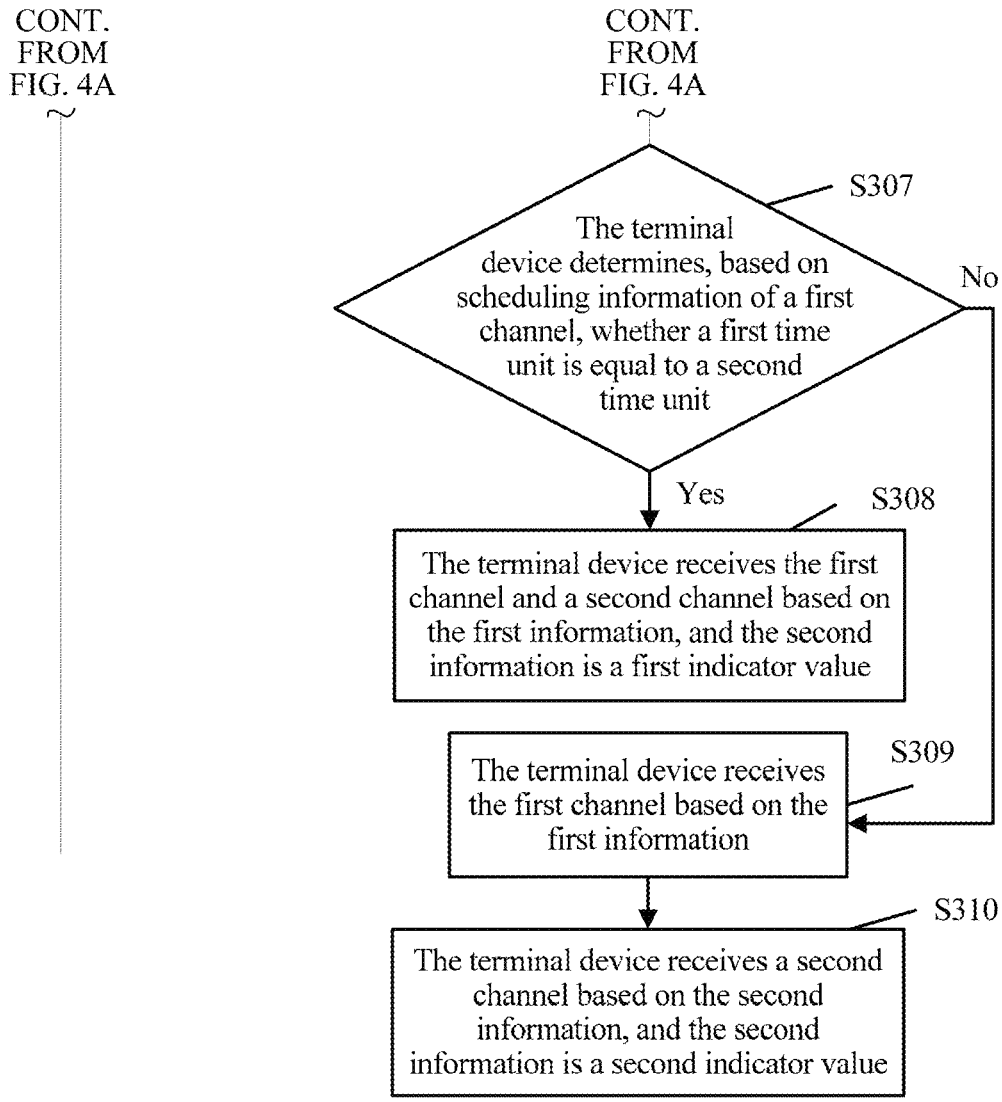

Referring to FIG. 3, FIG. 3 is a schematic structural diagram of a wireless communications system according to an embodiment of the present invention. As shown in FIG. 3, the wireless communications system includes a network device and a terminal device. Referring to FIG. 4A and FIG. 4B, FIG. 4A and FIG. 4B are a schematic flowchart of an information indication method according to this embodiment of the present invention. The information indication method may be performed based on the wireless communications system shown in FIG. 3. As shown in FIG. 4A and FIG. 4B, the information indication method may include the following steps.

S301. The terminal device reports a beamforming capability or a beamforming type to the network device.

S302. The network device determines first information and/or second information based on the beamforming capability or the beamforming type.

The first information is information used to instruct the terminal device to receive a first channel in a first time unit, and the second information is information used to instruct the terminal device to receive a second channel in a second time unit.

When determining that the first channel and the second channel are sent in a frequency division multiplexing manner, the network device may determine the first information or the second information based on the beamforming capability or the beamforming type, so that the terminal device receives the first channel and the second channel based on the first information or the second information. When determining that the first channel and the second channel are not multiplexed in a frequency division multiplexing manner, the network device may determine the first information and the second information based on the beamforming capability or the beamforming type, so that the terminal device receives the first channel based on the first information, and receives the second channel based on the second information.

S303. The network device sends the first information.

The network device may send the first information to the terminal device by using higher layer signaling and/or Media Access Control MAC signaling.

S304. The terminal device receives the first information.

S305. The network device sends the second information.

The network device may send the second information to the terminal device by using physical layer signaling.

S306. The terminal device receives the second information.

S307. The terminal device determines, based on scheduling information of a first channel, whether a first time unit is equal to a second time unit. If the first time unit is equal to the second time unit, perform step S308; or if the first time unit is not equal to the second time unit, perform steps S309 and S310.

S308. The terminal device receives the first channel and a second channel based on the first information, and the second information is a first indicator value.

The first indicator value may be indication information of a time domain resource location of the second channel, for example, the first indicator value may be a start symbol indication of the second channel; or the first indicator value may be indication information of a frequency domain resource location of the second channel, for example, the first indicator value may be an indication of a frequency domain resource of the first channel that needs to be removed from a frequency domain resource of the second channel; or the first indicator value may be indication information of a time domain resource location of the second channel and indication information of a frequency domain resource location of the second channel, for example, the first indicator value may be a start symbol indication of the second channel and an indication of a frequency domain resource of the first channel that needs to be removed from a frequency domain resource of the second channel; or the first indicator value may be indication information of a frequency domain resource granularity of the second channel, for example, the first indicator value may be an indication of a resource block group (Resource Block Group, RBG) size; or the first indicator value may be indication information of a time domain resource granularity of the second channel, for example, the first indicator value may be an indication of information about a time domain interval occupied by the second channel; or the first indicator value may be indication information of a time domain resource granularity of the second channel and indication information of a frequency domain resource granularity of the second channel, for example, the first indicator value may be an indication of information about a time domain interval occupied by the second channel and an indication of a resource block group (Resource Block Group, RBG) size.

It can be learned that in this implementation, the second information may be used to indicate the foregoing resource location information of the second channel, the information about the time domain interval or the frequency domain resource granularity of the second channel, or the like, so as to help to receive the second channel. For example, when data is received on the first channel and the second channel in a same time unit, the second information is the first indicator value, and the first indicator value may be the foregoing indication information used to indicate additional information required in a frequency division multiplexing case, for example, a time domain resource location and/or a frequency domain resource location of the second channel, and/or a time-frequency resource scheduling granularity. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine at least one piece of information such as a time domain resource location, a frequency domain resource location, a time domain resource scheduling granularity, and a frequency domain resource scheduling granularity that are used when the second channel is received.

There may be a plurality of first channels, and the first information used to receive the first channel may also include a plurality of pieces of information used to instruct the terminal device to receive the first channel in the first time unit. Therefore, in this application, the first channel is a channel that schedules the second channel. Correspondingly, that the terminal device receives the second channel based on the first information includes: receiving, by the terminal device, the second channel based on the first information corresponding to the first channel that schedules the second channel.

S309. The terminal device receives the first channel based on the first information.

S310. The terminal device receives a second channel based on the second information, and the second information is a second indicator value.

The second indicator value may be indication information used to instruct the terminal device to receive the second channel. Alternatively, the second indicator value includes quasi-co-location QCL information between a first reference signal and a second reference signal, and the first information also includes quasi-co-location QCL information between the first reference signal and the second reference signal. In this implementation, the terminal device may receive the second channel based on the second indicator value, and the terminal device receives the first channel based on the first information. The quasi-co-location QCL information may also be referred to as quasi-co-location QCL (Quasi-Co-Location, QCL). The QCL information is used to help to describe receive side beamforming information and a receiving procedure of the terminal device.

To reduce overheads of indicating QCL information of the terminal device side by the network device side, in an optional implementation, the network device side may indicate that a QCL relationship is met between a demodulation reference signal of the first channel or the second channel and one or more of a plurality of reference signal resources previously reported by the terminal device. For example, the reference signal may be a channel state information-reference signal (Channel State Information-Reference Signal, CSI-RS). Herein, each reported index of a CSI-RS resource corresponds to one transmit and receive beam pair previously established when the CSI-RS resource is measured. It should be understood that receive beam information of two reference signals or channels that meet the QCL relationship is the same, so that the terminal device may deduce receive beam information of the first channel or the second channel based on the index of the reference signal resource.

For example, a receive beam used by the terminal device to receive a DMRS is the same as one receive beam in a plurality of CSI-RS measurement-based transmit and receive beam pairs that are previously reported by the terminal device. In other words, the QCL information may include at least one of a beam group index number of the second reference signal, a resource index number of the second reference signal, a port number of the second reference signal, and a port group number of the second reference signal that are reported by the terminal device. The second reference signal corresponds to one of the plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device. The resource index number that is of the second reference signal and that is reported by the terminal device may be one relative index number in a set including a plurality of resource index numbers reported by the terminal device. For example, if the terminal device reports four resource index numbers of the second reference signal, a resource index number that is of the second reference signal and that is reported by the terminal device is any one of $\{0, 1, 2, 3\}$.

Optionally, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

The first time unit and the second time unit may include at least one OFDM symbol, at least one timeslot, or at least one subframe. In other words, time units included in the first time unit and the second time unit may be different or the same, and the time unit may be at least one OFDM symbol, at least one timeslot, or at least one subframe.

It can be learned that in this embodiment of the present invention, a receive beam of the first channel and a receive beam of the second channel may be determined by using the first information and the second information or by using the first information, so as to avoid power consumption caused by searching for a receive beam for a long time. In addition, when the time unit for receiving the first channel is equal to the time unit for receiving the second channel, in other words, the first channel and the second channel are sent in a frequency division multiplexing manner, same receiving indication information may be used to receive the first channel and the second channel. The receiving indication information may be determined based on the first information, and the second information may be reused as an indication of other information. For example, the second information may be reused as other additional information that needs to be indicated in a frequency division multiplexing case, so as to avoid allocating new additional information, such as an additional bit in DCI, to indicate the other additional information, thereby reducing signaling overheads.

Figure 5:
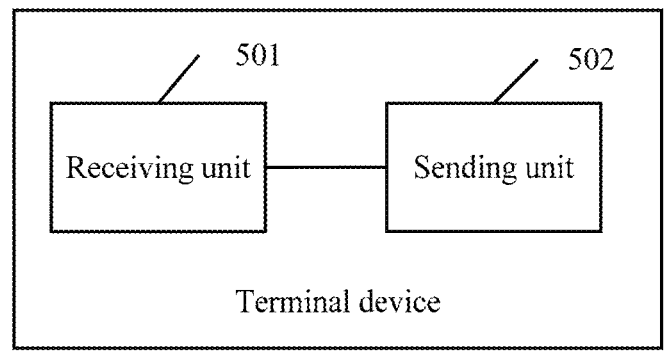
FIG. 5 is a schematic structural diagram of a terminal device according to an embodiment of the present invention.

Referring to FIG. 5, FIG. 5 is a schematic structural diagram of a terminal device according to an embodiment of the present invention. As shown in FIG. 5, the terminal device may include a receiving unit 501 and a sending unit

502. The receiving unit 501 and the sending unit 502 may be combined into a transceiver, and this is not limited in this embodiment of the present invention. Optionally, the terminal device may further include: a storage unit, configured to be coupled to the receiving unit and the sending unit, and the storage unit stores a program instruction and data that are necessary for the terminal device.

The receiving unit 501 is configured to receive first information, where the first information is information used to instruct the terminal device to receive a first channel in a first time unit.

The receiving unit 501 is further configured to receive second information, where the second information is information used to instruct the terminal device to receive a second channel in a second time unit.

The receiving unit 501 is further configured to receive the first channel based on the first information.

When the first time unit is equal to the second time unit, the receiving unit is configured to receive the second channel based on the first information, and the second information is a first indicator value; or when the first time unit is not equal to the second time unit, the receiving unit is configured to receive the second channel based on the second information, and the second information is a second indicator value.

In the terminal device shown in FIG. 5, the sending unit 502 is configured to: before the terminal device receives the first information and/or the second information, report a beamforming capability or a beamforming type to a network device.

In this embodiment of the present invention, the first channel may be a physical downlink control channel, and the second channel may be a physical downlink shared channel.

The first indicator value may be indication information of a time domain resource location of the second channel, for example, the first indicator value may be a start symbol indication of the second channel; or the first indicator value may be indication information of a frequency domain resource location of the second channel, for example, the first indicator value may be an indication of a frequency domain resource of the first channel that needs to be removed from a frequency domain resource of the second channel; or the first indicator value may be indication information of a time domain resource location of the second channel and indication information of a frequency domain resource location of the second channel, for example, the first indicator value may be a start symbol indication of the second channel and an indication of a frequency domain resource of the first channel that needs to be removed from a frequency domain resource of the second channel; or the first indicator value may be indication information of a frequency domain resource granularity of the second channel, for example, the first indicator value may be an indication of a resource block group (Resource Block Group, RBG) size; or the first indicator value may be indication information of a time domain resource granularity of the second channel, for example, the first indicator value may be an indication of information about a time domain interval occupied by the second channel; or the first indicator value may be indication information of a time domain resource granularity of the second channel and indication information of a frequency domain resource granularity of the second channel, for example, the first indicator value may be an indication of information about a time domain interval occupied by the second channel and an indication of a resource block group (Resource Block Group, RBG) size. It can be learned that in this implementation, the second information may be used to indicate the foregoing resource location information of the second channel, the information about the time domain interval or the frequency domain resource granularity of the second channel, or the like, so as to help to receive the second channel. For example, when data is received on the first channel and the second channel in a same time unit, the second information is the first indicator value, and the first indicator value may be the foregoing indication information used to indicate additional information required in a frequency division multiplexing case, for example, a time domain resource location and/or a frequency domain resource location of the second channel, and/or a time-frequency resource scheduling granularity. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine at least one piece of information such as a time domain resource location, a frequency domain resource location, a time domain resource scheduling granularity, and a frequency domain resource scheduling granularity that are used when the second channel is received.

In an implementation, the second information may be the second indicator value, and the second indicator value may be indication information used to instruct the terminal device to receive the second channel. Alternatively, the second indicator value includes quasi-co-location QCL information between a first reference signal and a second reference signal, and the first information also includes quasi-co-location QCL information between the first reference signal and the second reference signal. In this implementation, the terminal device may receive the second channel based on the second indicator value, and the terminal device receives the first channel based on the first information. The quasi-co-location QCL information may also be referred to as quasi-co-location QCL (Quasi-Co-Location, QCL). The QCL information is used to help to describe receive side beamforming information and a receiving procedure of the terminal device.

To reduce overheads of indicating QCL information of the terminal device side by the network device side, in an optional implementation, the network device side may indicate that a QCL relationship is met between a demodulation reference signal of the first channel or the second channel and one or more of a plurality of reference signal resources previously reported by the terminal device. For example, the reference signal may be a channel state information-reference signal (Channel State Information-Reference Signal, CSI-RS). Herein, each reported index of a CSI-RS resource corresponds to one transmit and receive beam pair previously established when the CSI-RS resource is measured. It should be understood that receive beam information of two reference signals or channels that meet the QCL relationship is the same, so that the terminal device may deduce receive beam information of the first channel or the second channel based on the index of the reference signal resource.

For example, a receive beam used by the terminal device to receive a DMRS is the same as one receive beam in a plurality of CSI-RS measurement-based transmit and receive beam pairs that are previously reported by the terminal device. In other words, the QCL information may include at least one of a beam group index number of the second reference signal, a resource index number of the second reference signal, a port number of the second reference signal, and a port group number of the second reference signal that are reported by the terminal device. The second reference signal corresponds to one of the plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device.

The resource index number that is of the second reference signal and that is reported by the terminal device may be one relative index number in a set including a plurality of resource index numbers reported by the terminal device. For example, if the terminal device reports four absolute resource index numbers {1, 5, 7, 9} of the second reference signal, based on the report result of the terminal device, a relative resource index number of the second reference signal is any one of {0, 1, 2, 3}. The relative resource index number 0 corresponds to the resource index number 1 that is of the second reference signal and that is reported by the terminal device. The relative resource index number 1 corresponds to the resource index number 5 that is of the second reference signal and that is reported by the terminal device. The relative resource index number 2 corresponds to the resource index number 7 that is of the second reference signal and that is reported by the terminal device. The relative resource index number 3 corresponds to the resource index number 9 that is of the second reference signal and that is reported by the terminal device.

Optionally, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

Before the terminal device receives the first information and/or the second information, the terminal device further needs to report the beamforming capability or the beamforming type to the network device, and the beamforming capability or the beamforming type is used to determine the first information and/or the second information. Optionally, in this application, the beamforming capability or the beamforming type is a receive beamforming capability or a receive beamforming type of the terminal device. For example, the receive beamforming capability or the receive beamforming type includes at least one of an analog receive beamforming type, a digit receive beamforming type, and a hybrid receive beamforming (analog and digit receive beamforming) type. Flexibility of the analog receive beamforming is poorest (the terminal device can use only one or one group of receive beams at one receiving moment), and flexibility of the digit receive beamforming is best (the terminal device may use a plurality of or a plurality of groups of receive beams at one receiving moment).

Based on the receive beamforming capability or the receive beamforming type reported by the terminal device, the network device may determine whether indication information used for the first channel is the same as indication information used for the second channel, so as to determine to set, for the terminal device, the first information and the second information for receiving the first channel and/or the second channel, and determine whether the second information is at least one of the first indicator value or the second indicator value. For example, when the first time unit in the indication information is equal to the second time unit, the beamforming capability or the beamforming type is used by the network device to set, for the terminal device, the first information for receiving the first channel and the second channel, or the first indicator value reused by the second information may be set; or when the first time unit is not equal to the second time unit, the beamforming capability or the beamforming type is used by the network device to separately set, for the terminal device, the first information for receiving the first channel and the second information for receiving the second channel, in other words, the second information is the second indicator value.

The first information is carried in radio resource control RRC signaling and/or Media Access Control MAC signaling, and the second information is carried in physical layer signaling. For example, the second information may be carried in downlink control information of the physical downlink control channel. Herein, the following possibility is not excluded that in addition to the radio resource control RRC signaling and/or the Media Access Control MAC signaling, the first information is carried in physical layer signaling, for example, carried in the downlink control information of the physical downlink control channel.

The first channel may be transmitted a plurality of times on a plurality of time-frequency resources by using different beams, and receive beam indications corresponding to the first channel transmitted on the plurality of time-frequency resources may be different. Therefore, the first information used to receive the first channel may also include a plurality of pieces of indication information used to instruct the terminal device to receive the first channel in the first time unit. In this application, that the receiving unit 501 receives the second channel based on the first information is specifically as follows: The receiving unit 501 receives the second channel based on the first information corresponding to the first channel that schedules the second channel. When the terminal device detects scheduling information of the second channel on the plurality of time-frequency resources for transmitting the first channel, the first channel that schedules the second channel may be the first channel transmitted on one of the plurality of time-frequency resources for transmitting the first channel. Herein, one of the plurality of time-frequency resources for transmitting the first channel may be predefined or may be configured by the network device for the terminal device.

The first time unit and the second time unit may include at least one OFDM symbol, at least one timeslot, or at least one subframe. In other words, time units included in the first time unit and the second time unit may be different or the same, and the time unit may be at least one OFDM symbol, at least one timeslot, or at least one subframe. Optionally, a granularity of the time unit may also be a unit of time at a smaller or larger granularity than the foregoing time granularity, and this is not specifically limited herein.

It can be learned that in this embodiment of the present invention, a receive beam of the first channel and a receive beam of the second channel may be determined by using the first information and the second information or by using the first information, so as to avoid power consumption caused by searching for a receive beam for a long time. In addition, when the time unit for receiving the first channel by the receiving unit 501 is equal to the time unit for receiving the second channel by the receiving unit 501, in other words, the first channel and the second channel are sent in a frequency division multiplexing manner, the receiving unit may receive the first channel and the second channel by using same receiving indication information. The receiving indication information may be determined based on the first information, and the second information may be reused as an indication of other information. For example, the second information may be reused as other additional information that needs to be indicated in a frequency division multiplexing case, so as to avoid allocating new additional information, such as an additional bit in DCI, to indicate the other additional information, thereby reducing signaling overheads.

Figure 6:
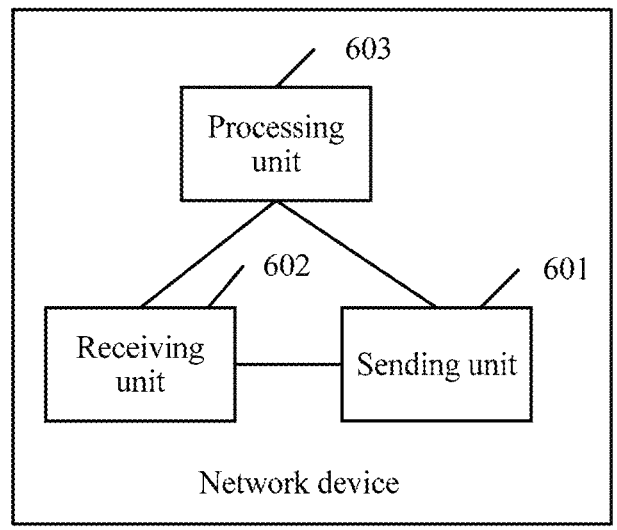
FIG. 6 is a schematic structural diagram of a network device according to an embodiment of the present invention.

Referring to FIG. 6, FIG. 6 is a schematic structural diagram of a network device according to an embodiment of the present invention. As shown in FIG. 6, the network device may include a sending unit 601, a receiving unit 602, and a processing unit 603. The sending unit 601 and the receiving unit 602 may be combined into a transceiver, and the processing unit 603 may be a processor. The network device may further include: a storage unit, configured to be coupled to the processing unit, the receiving unit, and the sending unit, and the storage unit stores a program instruction and data that are necessary for the network device.

The sending unit 601 is configured to send first information, where the first information is information used to instruct a terminal device to receive a first channel in a first time unit.

The sending unit 601 is further configured to send second information, where the second information is information used to instruct the terminal device to receive a second channel in a second time unit.

When the first time unit is equal to the second time unit, the first information is further used by the terminal device to receive the second channel, and the second information is a first indicator value; or when the first time unit is not equal to the second time unit, the second information is used by the terminal device to receive the second channel, and the second information is a second indicator value.

The receiving unit 602 is configured to receive a beamforming capability or a beamforming type reported by the terminal device.

The processing unit 603 is configured to determine the first information and/or the second information based on the beamforming capability or the beamforming type.

That when the first time unit is equal to the second time unit, the first information is used by the terminal device to receive the second channel in the second time unit is specifically: information corresponding to the first channel that schedules the second channel in the first information is used by the terminal device to receive the second channel in the second time unit.

In this embodiment of the present invention, the first channel may be a physical downlink control channel, and the second channel may be a physical downlink shared channel.

The first indicator value may be indication information of a time domain resource location of the second channel, for example, the first indicator value may be a start symbol indication of the second channel; or the first indicator value may be indication information of a frequency domain resource location of the second channel, for example, the first indicator value may be an indication of a frequency domain resource of the first channel that needs to be removed from a frequency domain resource of the second channel; or the first indicator value may be indication information of a time domain resource location of the second channel and indication information of a frequency domain resource location of the second channel, for example, the first indicator value may be a start symbol indication of the second channel and an indication of a frequency domain resource of the first channel that needs to be removed from a frequency domain resource of the second channel; or the first indicator value may be indication information of a frequency domain resource granularity of the second channel, for example, the first indicator value may be an indication of a resource block group (Resource Block Group, RBG) size; or the first indicator value may be indication information of a time domain resource granularity of the second channel, for example, the first indicator value may be an indication of information about a time domain interval occupied by the second channel; or the first indicator value may be indication information of a time domain resource granularity of the second channel and indication information of a frequency domain resource granularity of the second channel, for example, the first indicator value may be an indication of information about a time domain interval occupied by the second channel and an indication of a resource block group (Resource Block Group, RBG) size. It can be learned that in this implementation, the second information may be used to indicate the foregoing resource location information of the second channel, the information about the time domain interval or the frequency domain resource granularity of the second channel, or the like, so as to help to receive the second channel. For example, when data is received on the first channel and the second channel in a same time unit, the second information is the first indicator value, and the first indicator value may be the foregoing indication information used to indicate additional information required in a frequency division multiplexing case, for example, a time domain resource location and/or a frequency domain resource location of the second channel, and/or a time-frequency resource scheduling granularity. When data is received on the first channel and the second channel in a same time unit, in other words, the first channel and the second channel are sent in a frequency division multiplexing manner, the terminal device receives the second channel based on the first information and the first indicator value of the second information. The first information is used to determine information related to a receive beam used when the second channel is received, and the first indicator value of the second information is used to determine at least one piece of information such as a time domain resource location, a frequency domain resource location, a time domain resource scheduling granularity, and a frequency domain resource scheduling granularity that are used when the second channel is received.

In an implementation, the second information may be the second indicator value, and the second indicator value may be indication information used to instruct the terminal device to receive the second channel. Alternatively, the second indicator value includes quasi-co-location QCL information between a first reference signal and a second reference signal, and the first information also includes quasi-co-location QCL information between the first reference signal and the second reference signal. In this implementation, the terminal device may receive the second channel based on the second indicator value, and the terminal device receives the first channel based on the first information. The quasi-co-location QCL information may also be referred to as quasi-co-location QCL (Quasi-Co-Location, QCL). The QCL information is used to help to describe receive side beamforming information and a receiving procedure of the terminal device.

To reduce overheads of indicating QCL information of the terminal device side by the network device side, in an optional implementation, the network device side may indicate that a QCL relationship is met between a demodulation reference signal of the first channel or the second channel and one or more of a plurality of reference signal resources previously reported by the terminal device. For example, the reference signal may be a channel state information-reference signal (Channel State Information-Reference Signal, CSI-RS). Herein, each reported index of a CSI-RS resource corresponds to one transmit and receive beam pair previously established when the CSI-RS resource is measured. It should be understood that receive beam information of two reference signals or channels that meet the QCL relationship is the same, so that the terminal device may deduce receive beam information of the first channel or the second channel based on the index of the reference signal resource.

For example, a receive beam used by the terminal device to receive a DMRS is the same as one receive beam in a plurality of CSI-RS measurement-based transmit and receive beam pairs that are previously reported by the terminal device. In other words, the QCL information may include at least one of a beam group index number of the second reference signal, a resource index number of the second reference signal, a port number of the second reference signal, and a port group number of the second reference signal that are reported by the terminal device. The second reference signal corresponds to one of the plurality of CSI-RS measurement-based transmit and receive beam pairs that are previously reported by the terminal device. Herein, the beam group index number that is of the second reference signal and that is reported by the terminal device is equivalent to one resource set index number that is of the second reference signal and that is reported by the terminal device. The resource index number that is of the second reference signal and that is reported by the terminal device may be one relative index number in a set including a plurality of resource index numbers reported by the terminal device. For example, if the terminal device reports four absolute resource index numbers {1, 5, 7, 9} of the second reference signal, based on the report result of the terminal device, a relative resource index number of the second reference signal is any one of {0, 1, 2, 3}. The relative resource index number 0 corresponds to the resource index number 1 that is of the second reference signal and that is reported by the terminal device. The relative resource index number 1 corresponds to the resource index number 5 that is of the second reference signal and that is reported by the terminal device. The relative resource index number 2 corresponds to the resource index number 7 that is of the second reference signal and that is reported by the terminal device. The relative resource index number 3 corresponds to the resource index number 9 that is of the second reference signal and that is reported by the terminal device. Optionally, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of arrival (ZoA), an azimuth angle spread of arrival (ASA), and a zenith angle spread of arrival (ZSA). These spatial characteristic parameters are used to describe a characteristic of a spatial channel between an antenna port of the first reference signal and an antenna port of the second reference signal, so that the terminal device completes a receive side beamforming process or a receiving processing process based on the QCL information.

Before the terminal device receives the first information and/or the second information, the terminal device further needs to report the beamforming capability or the beamforming type to the network device, and the beamforming capability or the beamforming type is used to determine the first information and/or the second information.

Optionally, in this application, the beamforming capability or the beamforming type is a receive beamforming capability or a receive beamforming type of the terminal device. For example, the receive beamforming capability or the receive beamforming type includes at least one of an analog receive beamforming type, a digit receive beamforming type, and a hybrid receive beamforming (analog and digit receive beamforming) type. Flexibility of the analog receive beamforming is poorest (the terminal device can use only one or one group of receive beams at one receiving moment), and flexibility of the digit receive beamforming is best (the terminal device may use a plurality of or a plurality of groups of receive beams at one receiving moment).

Based on the receive beamforming capability or the receive beamforming type reported by the terminal device, the network device may determine whether indication information used for the first channel is the same as indication information used for the second channel, so as to determine to set, for the terminal device, the first information and the second information for receiving the first channel and/or the second channel, and determine whether the second information is at least one of the first indicator value, the second indicator value, or the like. For example, when the first time unit in the indication information is equal to the second time unit, the beamforming capability or the beamforming type is used by the network device to set, for the terminal device, the first information for receiving the first channel and the second channel, or the first indicator value reused by the second information may be set; or when the first time unit in the indication information is not equal to the second time unit, the beamforming capability or the beamforming type is used by the network device to separately set, for the terminal device, the first information for receiving the first channel and the second information for receiving the second channel.

The first information is carried in radio resource control RRC signaling and/or Media Access Control MAC signaling, and the second information is carried in physical layer signaling. For example, the second information may be carried in downlink control information of the physical downlink control channel. Herein, the following possibility is not excluded that in addition to the radio resource control RRC signaling and/or the Media Access Control MAC signaling, the first information is carried in physical layer signaling, for example, carried in the downlink control information of the physical downlink control channel.

The first time unit and the second time unit may include at least one OFDM symbol, at least one timeslot, or at least one subframe. In other words, time units included in the first time unit and the second time unit may be different or the same, and the time unit may be at least one OFDM symbol, at least one timeslot, or at least one subframe. Optionally, a granularity of the time unit may also be a unit of time at a smaller or larger granularity than the foregoing time granularity, and this is not specifically limited herein.

It can be learned that in this embodiment of the present invention, a receive beam of the first channel and a receive beam of the second channel may be determined by using the first information and the second information or by using the first information, so as to avoid power consumption caused by searching for a receive beam for a long time. In addition, when the time unit for receiving the first channel by the receiving unit is equal to the time unit for receiving the second channel by the receiving unit, in other words, the first channel and the second channel are sent in a frequency division multiplexing manner, the receiving unit may receive the first channel and the second channel by using same receiving indication information. The receiving indication information may be determined based on the first information, and the second information may be reused as an indication of other information. For example, the second information may be reused as other additional information that needs to be indicated in a frequency division multiplexing case, so as to avoid allocating new additional information, such as an additional bit in DCI, to indicate the other additional information, thereby reducing signaling overheads.

Figure 7:
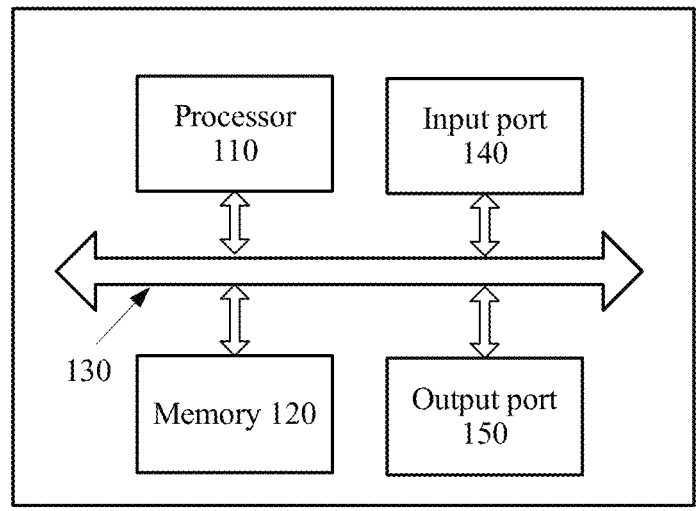
FIG. 7 is a first schematic diagram of a device according to an embodiment of the present invention.

According to the foregoing method, FIG. 7 is a first schematic diagram of a device according to an embodiment of the present invention. As shown in FIG. 7, the device may be a terminal device, or may be a chip or a circuit, for example, a chip or a circuit that may be disposed on the terminal device. The terminal device may correspond to the terminal device in the foregoing method.

The device may include a processor 110 and a memory 120. The memory 120 is configured to store an instruction, and the processor 110 is configured to execute the instruction stored in the memory 120, so as to implement steps in the method corresponding to FIG. 1 to FIG. 4A and FIG. 4B.

Further, the device may further include an input port 140 and an output port 150. Further, the device may further include a bus system 130, and the processor 110, the memory 120, the input port 140, and the output port 150 may be connected by using the bus system 130.

The processor 110 is configured to execute the instruction stored in the memory 120, so as to control the input port 140 to receive a signal, and control the output port 150 to send a signal, to complete the steps of the terminal device in the foregoing method. The input port 140 and the output port 150 may be a same physical entity or different physical entities. When the input port 140 and the output port 150 are a same physical entity, the input port 140 and the output port 150 may be collectively referred to as a transceiver. The memory 120 may be integrated into the processor 110, or may be separated from the processor 110.

In an implementation, it may be considered that functions of the input port 140 and the output port 150 are implemented by using a transceiver circuit or a dedicated transceiver chip. It may be considered that the processor 110 is implemented by using a dedicated processing chip, a processing circuit, a processor, or a general purpose chip.

In another implementation, it may be considered that the terminal device provided in this embodiment of the present invention is implemented by using a general purpose computer. To be specific, program code for implementing functions of the processor 110, the input port 140, and the output port 150 are stored in the memory, and a general purpose processor implements the functions of the processor 110, the input port 140, and the output port 150 by executing the code in the memory.

For a concept, explanation, detailed description, and other steps that are related to the device and the technical solution provided in this embodiment of the present invention, refer to descriptions about the content in the foregoing method or in another embodiment. Details are not described herein again.

Figure 8:
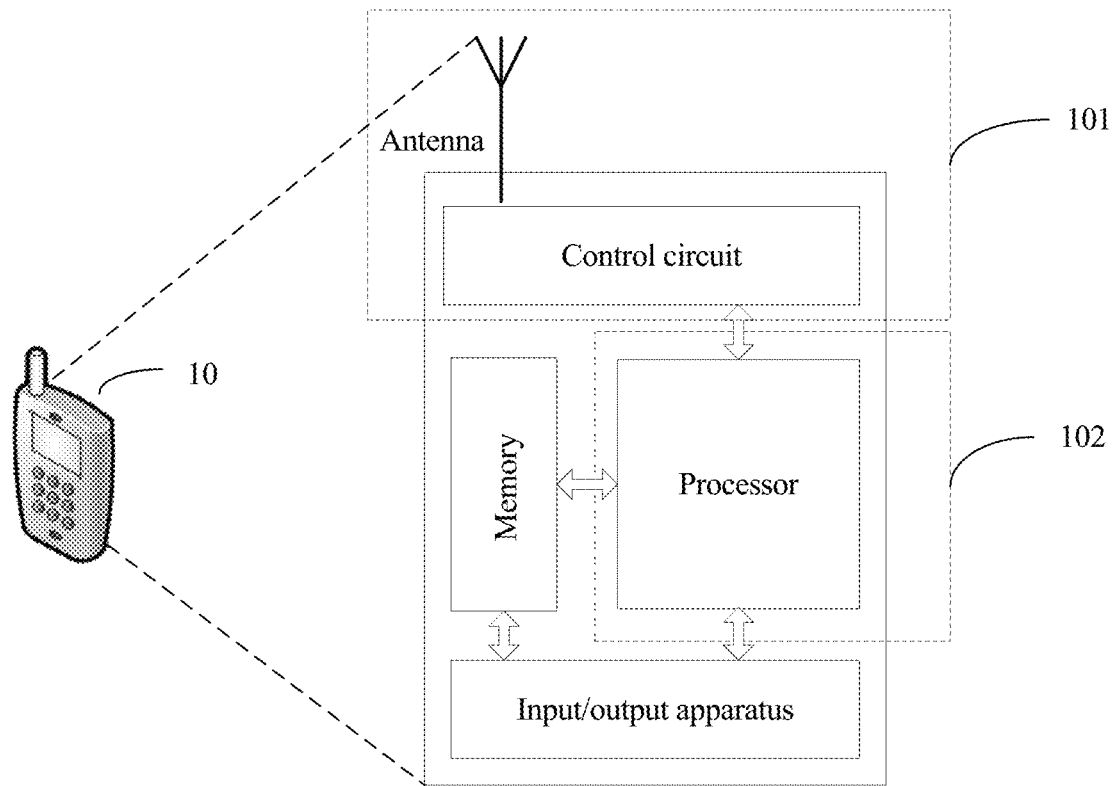
FIG. 8 is a schematic structural diagram of another terminal device according to an embodiment of the present invention.

FIG. 8 is a schematic structural diagram of another terminal device according to an embodiment of the present invention. The terminal device is applicable to the system shown in FIG. 3. For ease of description, FIG. 8 shows only main components of the terminal device. As shown in FIG. 8, the terminal device includes a processor, a memory, a control circuit, an antenna, and an input/output apparatus. The processor is mainly configured to: process a communication protocol and communication data, control the entire terminal device, execute a software program, and process data of the software program, for example, support the terminal device in performing the actions described in the embodiment of the information indication method. The memory is mainly configured to store a software program and data, for example, store information about the downlink scheduling resource in the foregoing embodiment, or overlap information or interference indication information of the downlink scheduling resource. The control circuit is mainly used for converting a baseband signal and a radio frequency signal and processing a radio frequency signal. The control circuit, together with the antenna, may also be referred to as a transceiver that is mainly configured to transmit and receive a radio frequency signal in an electromagnetic wave form. The input/output apparatus, for example, a touchscreen, a display, or a keyboard, is mainly configured to receive data entered by a user and output data to a user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 8 shows only one memory and one processor. In actual user equipment, a plurality of processors and memories may exist. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. Functions of the baseband processor and the central processing unit are integrated into the processor in FIG. 8. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the user equipment may include a plurality of central processing units to enhance processing capabilities of the user equipment, and various components of the user equipment may be connected by using various buses. The baseband processor may also be expressed as a baseband processing circuit or a baseband processing chip. The central processing unit may also be expressed as a central processing circuit or a central processing chip. A function of processing a communication protocol and communication data may be built into the processor, or may be stored in a storage unit in a form of a software program, so that the processor executes the software program to implement a baseband processing function.

For example, in this embodiment of the present invention, the antenna and the control circuit that have a transceiver function may be considered as a transceiver unit 101 of the user equipment, and a processor that has a processing function is considered as a processing unit 102 of the user equipment. As shown in FIG. 8, the user equipment includes a transceiver unit 101 and a processing unit 102. The transceiver unit may also be referred to as a transceiver, a transceiver apparatus, or the like. Optionally, a device configured to implement a receiving function in the transceiver unit 101 may be considered as a receiving unit, and a device configured to implement a sending function in the transceiver unit 101 may be considered as a sending unit. In other words, the transceiver unit 101 includes a receiving unit and a sending unit. For example, the receiving unit may also be referred to as a receiver, an input port, a receiver circuit, or the like. The sending unit may be referred to as a transmitter, an output port, a transmitter circuit, or the like.

Figure 9:
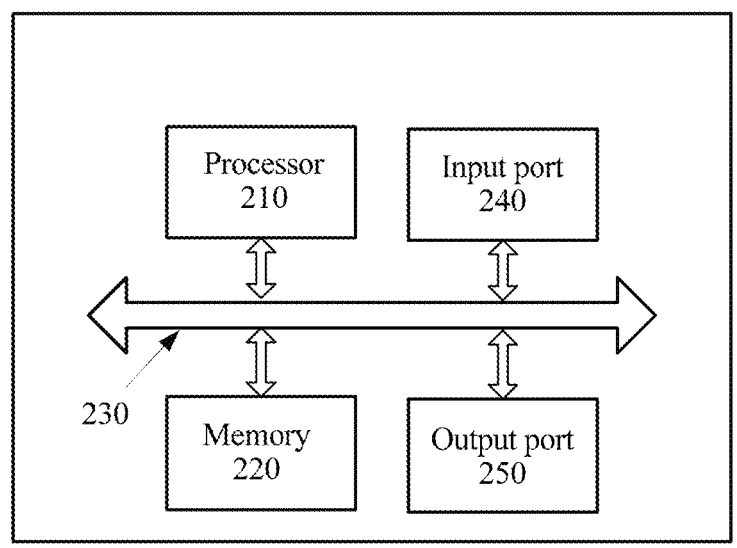
FIG. 9 is a second schematic diagram of a device according to an embodiment of the present invention.

According to the foregoing method, FIG. 9 is a second schematic diagram of a device according to an embodiment of the present invention. As shown in FIG. 9, the device may be a network device 20, or may be a chip or a circuit, for example, a chip or a circuit that may be disposed on the network device. The network device 20 corresponds to the network device in the foregoing method. The device may include a processor 210 and a memory 220. The memory 220 is configured to store an instruction, and the processor 210 is configured to execute the instruction stored in the memory 220, so that the device implements the method corresponding to FIG. 1 to FIG. 4A and FIG. 4B.

Further, the network device may further include an input port 240 and an output port 250. Still further, the network device may further include a bus system 230.

The processor 210, the memory 220, the input port 240, and the output port 250 are connected by using the bus system 230. The processor 210 is configured to execute the instruction stored in the memory 220, so as to control the input port 240 to receive a signal, and control the output port 250 to send a signal, to complete the steps of the network device in the foregoing method. The input port 240 and the output port 250 may be a same physical entity or different physical entities. When the input port 240 and the output port 250 are a same physical entity, the input port 240 and the output port 250 may be collectively referred to as an input/output port. The memory 220 may be integrated into the processor 210, or may be separated from the processor 210.

In an implementation, it may be considered that functions of the input port 240 and the output port 250 are implemented by using a transceiver circuit or a dedicated transceiver chip. It may be considered that the processor 210 is implemented by using a dedicated processing chip, a processing circuit, a processor, or a general purpose chip.

In another implementation, it may be considered that the network device provided in this embodiment of the present invention is implemented by using a general purpose computer. To be specific, program code for implementing functions of the processor 210, the input port 240, and the output port 250 are stored in the memory, and a general purpose processor implements the functions of the processor 210, the input port 240, and the output port 250 by executing the code in the memory.

For a concept, explanation, detailed description, and other steps that are related to the device and the technical solution provided in this embodiment of the present invention, refer to descriptions about the content in the foregoing method or in another embodiment. Details are not described herein again.

Figure 10:
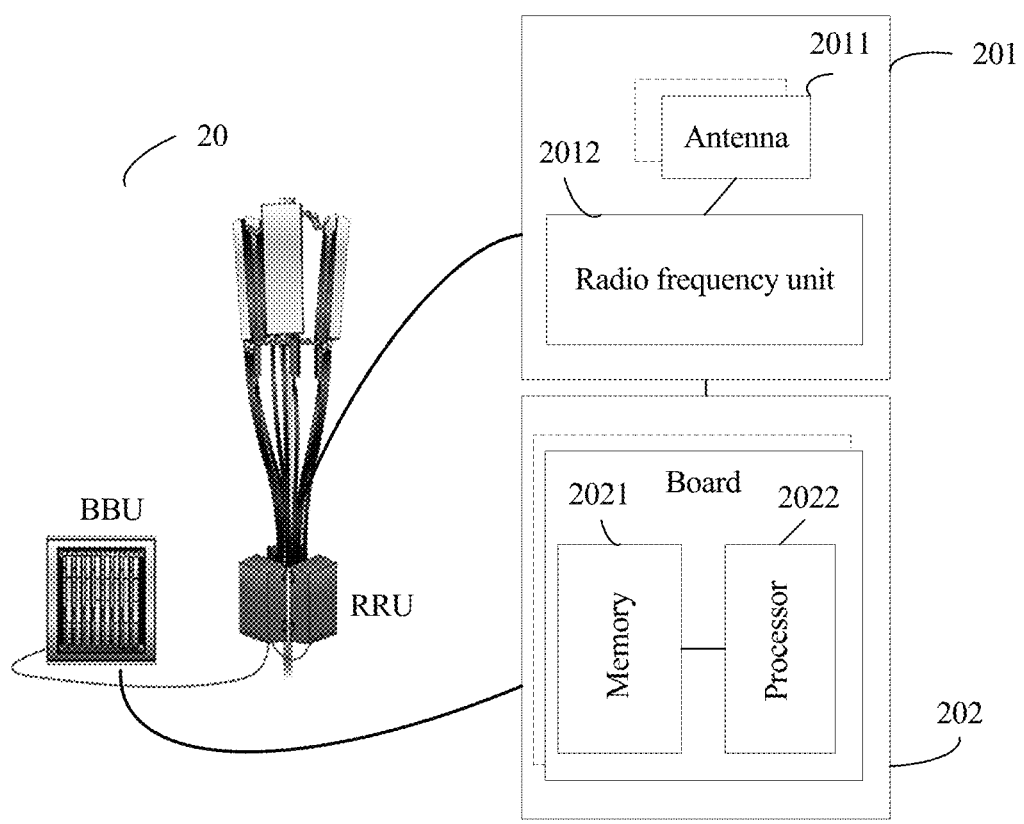
FIG. 10 is a schematic structural diagram of another network device according to an embodiment of the present invention.

According to the foregoing method, FIG. 10 is a schematic structural diagram of another network device according to an embodiment of the present invention. For example, FIG. 10 may be a schematic structural diagram of a base station. As shown in FIG. 10, the base station may be applied to the system shown in FIG. 3. The base station 20 includes one or more radio frequency units, such as a remote radio unit (RRU) 201 and one or more baseband units (BBU) (also referred to as a digital unit (DU)) 202. The RRU 201 may be referred to as a transceiver unit, a transceiver, a transceiver circuit, a transceiver, or the like, and may include at least one antenna 2011 and a radio frequency unit 2012. The RRU 201 is mainly used for transmitting and receiving a radio frequency signal and converting a radio frequency signal and a baseband signal, for example, sending the signaling in the foregoing embodiment to a terminal device. For example, the BBU 202 is mainly configured to: perform baseband processing and control the base station. The RRU 201 and the BBU 202 may be physically disposed together, or may be physically separated, in other words, in a distributed base station.

The BBU 202 is a control center of the base station, or may be referred to as a processing unit, and is mainly configured to complete baseband processing functions such as channel coding, multiplexing, modulation, and spectrum spreading. For example, the BBU (or the processing unit) may be configured to control the base station to execute an operation procedure of the network device in the foregoing method embodiment.

In an example, the BBU 202 may include one or more boards, and a plurality of boards may jointly support a radio access network (such as an LTE network) of a single access technology, or may separately support radio access networks of different access technologies. The BBU 202 further includes a memory 2021 and a processor 2022. The memory 2021 is configured to store a necessary instruction and data. For example, the memory 2021 stores information about the downlink scheduling resource in the foregoing embodiment, or overlap information or interference indication information of the downlink scheduling resource. The processor 2022 is configured to control the base station to perform necessary actions. For example, the processor 2022 is configured to control the base station to execute an operation procedure of the network device in the foregoing method embodiment. The memory 2021 and the processor 2022 may serve one or more boards. In other words, a memory and a processor may be separately disposed on each board. Alternatively, a plurality of boards may share a same memory and a same processor. In addition, a necessary circuit may be further disposed on each board.

According to the method provided in the embodiments of the present invention, an embodiment of the present invention further provides a communications system, including the foregoing network device and one or more terminal devices.

It should be understood that in the embodiment of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like.

The memory may include a read-only memory and a random access memory, and provide an instruction and data for the processor. A part of the memory may further include a non-volatile random access memory.

The bus system may include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be further understood that "first", "second", "third", "fourth", and various numbers are merely used for differentiation for ease of description, and are not construed as a limitation on the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, in combination with illustrative logical blocks (illustrative logical block) described in the embodiments disclosed in this specification and steps (step) can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions are generated according to the embodiments of the present invention. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information indication method, comprising:
receiving, by a terminal device, first information, wherein the first information is information used to instruct the terminal device to receive a first channel in a first time unit;
receiving, by the terminal device, second information, wherein the second information is information used to instruct the terminal device to receive a second channel in a second time unit; and
when the first time unit is equal to the second time unit, receiving, by the terminal device, the first channel and the second channel based on the first information, wherein the second information comprises a first indicator value, and wherein the first indicator value does not comprise quasi-co-location (QCL) information between different reference signals; or
when the first time unit is not equal to the second time unit, receiving, by the terminal device, the first channel based on the first information, and receiving the second channel based on the second information, wherein the second information comprises a second indicator value, and wherein the second indicator value comprises QCL information between different reference signals.

2. The information indication method according to claim 1, wherein the first channel is a physical downlink control channel, and wherein the second channel is a physical downlink shared channel.

3. The information indication method according to claim 1, wherein the first information is carried in at least one of radio resource control (RRC) signaling or Media Access Control (MAC) signaling, and wherein the second information is carried in physical layer signaling.

4. The information indication method according to claim 1, wherein the first time unit and the second time unit comprise at least one Orthogonal Frequency Division Multiplexing (OFDM) symbol, at least one timeslot, or at least one subframe.

5. The information indication method according to claim 1, wherein,
the first indication value is indication information of a time domain resource location on the second channel;
the first indication value is indication information of a frequency domain resource location on the second channel;
the first indication value is indication information of a time domain resource location and a frequency domain resource location of the second channel;
the first indicator value is indication information of a frequency domain resource granularity of the second channel;
the first indicator value is indication information of a time domain resource granularity of the second channel; or
the first indicator value is indication information of a time domain resource granularity and a frequency domain resource granularity of the second channel.

6. The information indication method according to claim 5, wherein the second indicator value comprises QCL information between a first reference signal and a second reference signal, wherein the first information comprises QCL information between the first reference signal and the second reference signal, wherein the first reference signal is used to demodulate the first channel or the second channel, and wherein the second reference signal is a reference signal different from the first reference signal.

7. A terminal device, comprising:
a transceiver; and
one or more processors, the one or more processors configured tocontrol the transciever to:
receive first information, wherein the first information is information used to instruct the terminal device to receive a first channel in a first time unit;
receive second information, wherein the second information is information used to instruct the terminal device to receive a second channel in a second time unit; and
when the first time unit is equal to the second time unit, the transceiver is configured to receive the first channel and the second channel based on the first information, wherein the second information comprises a first indicator value, and wherein the first indicator value does not comprise quasi-co-location (QCL) information between different reference signals; or
when the first time unit is not equal to the second time unit, the transceiver is configured to receive the first channel based on the first information and receive the second channel based on the second information, wherein the second information comprises a second indicator value and wherein the second indicator value comprises QCL information between different reference signals.

8. The terminal device according to claim 7, wherein the first channel is a physical downlink control channel, and wherein the second channel is a physical downlink shared channel.

9. The terminal device according to claim 7, wherein the first information is carried in at least one of radio resource control (RRC) signaling or Media Access Control (MAC) signaling, and wherein the second information is carried in physical layer signaling.

10. The terminal device according to claim 7, wherein the first time unit and the second time unit comprise at least one Orthogonal Frequency Division Multiplexing (OFDM) symbol, at least one timeslot, or at least one subframe.

11. The terminal device according to claim 8, wherein,
the first indication value is indication information of a time domain resource location on the second channel;
the first indication value is indication information of a frequency domain resource location on the second channel;
the first indication value is indication information of a time domain resource location and a frequency domain resource location of the second channel;
the first indicator value is indication information of a frequency domain resource granularity of the second channel;
the first indicator value is indication information of a time domain resource granularity of the second channel; or
the first indicator value is indication information of a time domain resource granularity and a frequency domain resource granularity of the second channel.

12. The terminal device according to claim 11, wherein the second indicator value comprises QCL information between a first reference signal and a second reference signal, wherein the first information comprises QCL information between the first reference signal and the second reference signal, wherein the first reference signal is used to demodulate the first channel or the second channel, and wherein the second reference signal is a reference signal different from the first reference signal.

13. A network device, comprising:
a transceiver, configured to:
send first information, wherein the first information is information used to instruct a terminal device to receive a first channel in a first time unit;
send second information, wherein the second information is information used to instruct the terminal device to receive a second channel in a second time unit; and
when the first time unit is equal to the second time unit, the first information is used by the terminal device to receive the first channel and the second channel, and the second information comprises a first indicator value, and wherein the first indicator value does not comprise quasi-co-location (QCL) information between different reference signals; or
when the first time unit is not equal to the second time unit, the first information is used by the terminal device to receive the first channel, and the second information is used by the terminal device to receive the second channel, and the second information comprises a second indicator value, and wherein the second indicator value comprises QCL information between different reference signals.

14. The network device according to claim 13, wherein the first channel is a physical downlink control channel, and wherein the second channel is a physical downlink shared channel.

15. The network device according to claim 13, wherein the first time unit and the second time unit comprise at least one Orthogonal Frequency Division Multiplexing (OFDM) symbol, at least one timeslot, or at least one subframe.

16. The network device according to claim 13, wherein,
the first indication value is indication information of a time domain resource location on the second channel;
the first indication value is indication information of a frequency domain resource location on the second channel;
the first indication value is indication information of a time domain resource location and a frequency domain resource location of the second channel;
the first indicator value is indication information of a frequency domain resource granularity of the second channel;
the first indicator value is indication information of a time domain resource granularity of the second channel; or
the first indicator value is indication information of a time domain resource granularity and a frequency domain resource granularity of the second channel.

17. The network device according to claim 16, wherein the second indicator value comprises QCL information between a first reference signal and a second reference signal, wherein the first information comprises QCL information between the first reference signal and the second reference signal, wherein the first reference signal is used to demodulate the first channel or the second channel, and wherein the second reference signal is a reference signal different from the first reference signal.

18. The network device according to claim 13, wherein the first information is carried in at least one of radio resource control (RRC) signaling or Media Access Control (MAC) signaling, and wherein the second information is carried in physical layer signaling.

19. A non-transitory computer readable medium comprising instructions which, when executed by one or more processors, cause the one or more processors to execute an information indication method, wherein the method comprises:
receiving, first information, wherein the first information is information used to instruct a terminal device to receive a first channel in a first time unit;
receiving, second information, wherein the second information is information used to instruct the terminal device to receive a second channel in a second time unit; and
when the first time unit is equal to the second time unit, receiving the first channel and the second channel based on the first information, wherein the second information comprises a first indicator value, and wherein the first indicator value does not comprise quasi-co-location (QCL) information between different reference signals; or
when the first time unit is not equal to the second time unit, receiving the first channel based on the first information, and receiving the second channel based on the second information, wherein the second information comprises a second indicator value, and wherein the second indicator value comprises QCL information between different reference signals.

20. The non-transitory computer readable medium according to claim 19, wherein the first channel is a physical downlink control channel, and wherein the second channel is a physical downlink shared channel.

21. The non-transitory computer readable medium according to claim 18, wherein the first information is carried in at least one of radio resource control (RRC) signaling or Media Access Control (MAC) signaling, and wherein the second information is carried in physical layer signaling.

22. The non-transitory computer readable medium according to claim 19, wherein the first time unit and the second time unit comprise at least one Orthogonal Frequency Division Multiplexing (OFDM) symbol, at least one timeslot, or at least one subframe.

23. The non-transitory computer readable medium according to claim 18, wherein,
the first indication value is indication information of a time domain resource location on the second channel;
the first indication value is indication information of a frequency domain resource location on the second channel;
the first indication value is indication information of a time domain resource location and a frequency domain resource location of the second channel;
the first indicator value is indication information of a frequency domain resource granularity of the second channel;
the first indicator value is indication information of a time domain resource granularity of the second channel; or
the first indicator value is indication information of a time domain resource granularity and a frequency domain resource granularity of the second channel.

24. The non-transitory computer readable medium according to claim 23, wherein the second indicator value comprises QCL information between a first reference signal and a second reference signal, wherein the first information comprises QCL information between the first reference signal and the second reference signal, wherein the first reference signal is used to demodulate the first channel or the second channel, and wherein the second reference signal is a reference signal different from the first reference signal.

\* \* \* \* \*